(12) United States Patent
Ghayour et al.

(10) Patent No.: US 8,892,412 B2
(45) Date of Patent: *Nov. 18, 2014

(54) ADJOINT-BASED CONDITIONING OF PROCESS-BASED GEOLOGIC MODELS

(75) Inventors: Kaveh Ghayour, Houston, TX (US); Tao Sun, Missouri City, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 41 days.

This patent is subject to a terminal disclaimer.

(21) Appl. No.: 13/148,643

(22) PCT Filed: Dec. 3, 2009

(86) PCT No.: PCT/US2009/066609
§ 371 (c)(1), (2), (4) Date: Aug. 9, 2011

(87) PCT Pub. No.: WO2010/104537
PCT Pub. Date: Sep. 16, 2010

(65) Prior Publication Data
US 2011/0308811 A1    Dec. 22, 2011

Related U.S. Application Data

(60) Provisional application No. 61/159,357, filed on Mar. 11, 2009.

(51) Int. Cl.
  G06F 7/48      (2006.01)
  E21B 47/00     (2012.01)
  G01V 1/30      (2006.01)

(52) U.S. Cl.
  CPC ........................... G01V 1/30 (2013.01)
  USPC ................ 703/9; 703/10; 166/250.01

(58) Field of Classification Search
  CPC ........... G06F 17/5009; G06F 17/5018; G06F 2217/16; G06F 17/5095; E21B 43/00; E21B 49/00; G01V 1/24; G01V 1/30; G01V 11/00
  USPC .................... 703/9, 10; 166/250.01
  See application file for complete search history.

(56) References Cited

U.S. PATENT DOCUMENTS 4,958,073 A    9/1990  Becker et al.
(Continued)

FOREIGN PATENT DOCUMENTS

FR         2852710          9/2004
WO    WO 2006/066166       6/2006
(Continued)

OTHER PUBLICATIONS

Howard (Modelling channel migration and floodplain sedimentation in meandering streams, (41 pages), 1992).*

(Continued)

Primary Examiner — Kamini S Shah
Assistant Examiner — Andre Pierre Louis
(74) Attorney, Agent, or Firm — ExxonMobil Upstream Research Company Law Department

(57) ABSTRACT

A method for correlating data predicted by a processor physics-based geologic model to describe a subsurface region with obtained data describing the subsurface region. Data is obtained describing an initial state of the subsurface region. Data describing a subsequent state of the subsurface region is predicted. The predicted data is compared with the obtained data taking into account whether the obtained data or the predicted data represent a discontinuous event. A sensitivity of the predicted data is determined if the predicted data is not within an acceptable range of the obtained data. The data describing the initial state of the subsurface region is adjusted based on the sensitivity before performing a subsequent iteration of predicting data describing the subsequent state of the subsurface region. A representation of the subsurface region based on the data describing the subsequent state of the subsurface region is outputted.

23 Claims, 9 Drawing Sheets

(56) References Cited

U.S. PATENT DOCUMENTS

| | | |
|---|---|---|
| 5,239,474 A | 8/1993 | Eaton, Jr. et al. |
| 5,249,122 A | 9/1993 | Stritzke |
| 5,334,833 A | 8/1994 | Case et al. |
| 5,488,373 A | 1/1996 | Hellsten |
| 5,583,825 A | 12/1996 | Carrazzone et al. |
| 5,588,032 A | 12/1996 | Johnson et al. |
| 5,729,451 A | 3/1998 | Gibbs et al. |
| 5,761,346 A | 6/1998 | Moody |
| 5,844,799 A | 12/1998 | Joseph et al. |
| 5,892,700 A | 4/1999 | Haardt |
| 5,995,906 A | 11/1999 | Doyen et al. |
| 6,005,916 A | 12/1999 | Johnson et al. |
| 6,070,125 A | 5/2000 | Murphy et al. |
| 6,151,566 A | 11/2000 | Whiffen |
| 6,246,963 B1 | 6/2001 | Cross et al. |
| 6,381,543 B1 | 4/2002 | Guerillot et al. |
| 6,636,584 B2 | 10/2003 | Johnson et al. |
| 6,643,589 B2 | 11/2003 | Zhang et al. |
| 6,674,432 B2 | 1/2004 | Kennon et al. |
| 6,754,588 B2 | 6/2004 | Cross et al. |
| 6,756,592 B1 | 6/2004 | Smith et al. |
| 6,829,538 B2 | 12/2004 | Kok |
| 6,834,234 B2 | 12/2004 | Scherzinger et al. |
| 6,904,366 B2 | 6/2005 | Patzek et al. |
| 6,941,255 B2 | 9/2005 | Kennon et al. |
| 6,999,880 B2 | 2/2006 | Lee |
| 7,006,951 B2 | 2/2006 | Pond, Jr. et al. |
| 7,027,964 B2 | 4/2006 | Kennon |
| 7,043,367 B2 | 5/2006 | Granjeon |
| 7,043,413 B2 | 5/2006 | Ward et al. |
| 7,065,511 B2 | 6/2006 | Zhao et al. |
| 7,079,953 B2 | 7/2006 | Thorne et al. |
| 7,117,091 B2 | 10/2006 | Masson et al. |
| 7,123,258 B2 | 10/2006 | Deny et al. |
| 7,149,671 B2 | 12/2006 | Lim et al. |
| 7,200,533 B2 | 4/2007 | Hu et al. |
| 7,260,508 B2 | 8/2007 | Lim et al. |
| 7,292,241 B2 | 11/2007 | Thore et al. |
| 7,337,069 B2 | 2/2008 | Masson et al. |
| 7,340,385 B2 | 3/2008 | James |
| 7,363,158 B2 | 4/2008 | Stelting et al. |
| 7,369,973 B2 | 5/2008 | Kennon et al. |
| 7,392,136 B2 | 6/2008 | Salles et al. |
| 7,502,692 B2 | 3/2009 | Chen |
| 7,516,055 B2 | 4/2009 | Strebelle |
| 7,558,715 B2 | 7/2009 | Schaaf et al. |
| 7,617,082 B2 | 11/2009 | Childs et al. |
| 7,620,534 B2 | 11/2009 | Pita et al. |
| 7,630,517 B2 | 12/2009 | Mirowski et al. |
| 7,640,149 B2 | 12/2009 | Rowan et al. |
| 7,725,266 B2 | 5/2010 | Sirgue et al. |
| 7,788,074 B2 | 8/2010 | Scheidt et al. |
| 7,805,250 B2 | 9/2010 | Colombo et al. |
| 2001/0032053 A1* | 10/2001 | Hielscher et al. ............... 702/22 |
| 2002/0120429 A1 | 8/2002 | Ortoleva |
| 2003/0130852 A1 | 7/2003 | Tanaka et al. |
| 2005/0004833 A1 | 1/2005 | McRae et al. |
| 2006/0041409 A1 | 2/2006 | Strebelle et al. |
| 2006/0184329 A1* | 8/2006 | Rowan et al. ................... 702/50 |
| 2007/0095531 A1* | 5/2007 | Rosen ........................... 166/268 |
| 2007/0219725 A1 | 9/2007 | Sun et al. |
| 2007/0255500 A1 | 11/2007 | Pita et al. |
| 2007/0276604 A1 | 11/2007 | Williams et al. |
| 2008/0005690 A1 | 1/2008 | Van Vugt |
| 2008/0015784 A1 | 1/2008 | Dorn et al. |
| 2008/0059075 A1* | 3/2008 | Colombo et al. ............... 702/18 |
| 2008/0275648 A1 | 11/2008 | Illfelder |
| 2009/0006053 A1 | 1/2009 | Carazzone et al. |
| 2009/0119082 A1* | 5/2009 | Fitzpatrick et al. ............ 703/10 |
| 2009/0164182 A1 | 6/2009 | Pedersen et al. |
| 2009/0312995 A1 | 12/2009 | Pyrcz et al. |
| 2010/0211370 A1 | 8/2010 | Maliassov |

FOREIGN PATENT DOCUMENTS

| | | |
|---|---|---|
| WO | WO 2009/020715 | 2/2009 |
| WO | WO 2009/138290 | 11/2009 |
| WO | WO 2010/104536 | 9/2010 |

OTHER PUBLICATIONS

Bakx et al., (Meandering channel dynamics in highly cohesive sediment on an intertidal mud flat, (4 pages), 2007).*

Randle et al, Channel Migration Model for Meandering Rivers, 2006 (8 pages).*

Bängtsson, E. et al. (2003) "Shape optimization of an acoustic horn," *Computational Methods in Applied Mechanics and Engineering* 192, pp. 1533-1871.

Bosseur, F. et al. (2002), "Identification of boundary conditions in a nonlinear shallow water flow," *Computers & Mathematics with Applications* 43(12), pp. 1559-1573.

Bradley, J.H.S. (1976), "Recent developments in the matrix generalized eigenproblem for numerical weather simulation," 1976 Summer Computer Simulation Conf., pp. 43-45.

Bruneau, C.H. et al. (1997), "Optimal control data assimilation with an atmospheric model," *Numerical Functional Analysis and Optimization* 18(7-8), pp. 691-722.

Bunge, H.P. (2002), "Mantle-circulation models with sequential data assimilation; inferring present-day mantle structure from plate-motion histories," Philosphical Transactions—Royal Society, *Mathematical, Physical and Engineering Sciences* 360, pp. 2545-2567.

Burton, R. et al. (1987), "Out of Our Depth: on the Impossibility of Fathoming Eustasy from the Stratigraphic Record," *Earth-Science Review* 24, pp. 237-277.

Chavent, G. (1975), "History Matching by Use of Optimal Control Theory," *SPE Journal*, pp. 74-86.

Chen, W.H. (1974), "A New Algorithm for Automatic History Matching," *SPE Journal*, pp. 593-608.

Cheshire, I.M. (2001), History Matching and Numerical Well Testing 6th Leoben Mining Univ. Reservoir Simulation Intl. Forum, 17 pgs.

Cliffe, K. et al. (1995), "Conditioning stochastic groundwater flow", Materials Research Society Symposium Proceedings 353, pp. 455-462.

Collis, S.S. et al. (2002) "Optimal Control of Unsteady Compressible Viscous Flows," *Int'l J. for Numerical Methods in Fluids* 40, pp. 1401-1429.

Cui, H. et al. (2005), "Automatic History Matching of Naturally Fractured Reservoirs and a Case Study," SPE 94037, 2005 SPE Western Regional Mtg., 9 pgs.

Daoud, A.M. et al. (2005), "3D Field-Scale Automatic History Matching Using Adjoint Sensitivities and Generalized Travel-Time Inversion," SPE 101779, 2005 SPE Annual Tech. Conf. & Exh., 18 pgs.

Eydinov, D. et al. (2006), "Compositional and Grid Orientation Effects in History Matching", SPE 102676, 2006 SPE Annual Tech. Conf. & Exh., 8 pgs.

Franssen, H. et al. (1997), "Stochastic inverse modeling of transient groundwater flow," Proceedings of the Annual Conference of the International Association for Mathematical Geology 3, pp. 778-783.

Gejadze, I.Y. et al. (2006), "Open Boundary Control Problem for Navier-Stokes Equations including a Free Surface: Data Assimilation," *Computer Mathematics with Applications* 52, pp. 1269-1288.

Hier-Majumder, C.A. et al. (2006), "Efficient sensitivity analysis for flow and transport in the Earth's crust and mantle," *Geophys. J. Int.* 166, pp. 907-922.

Honnorat, M. et al. (2009), "Lagrangian data assimilation for river hydraulics simulations," *Comput. Visual Sci.* 12, pp. 235-246.

Howard, A. et al. (1984), "Sufficient Conditions for River Meandering: A Simulation Approach," *Water Resources Research* 20(11), pp. 1659-1667.

Ikeda, S. et al. (1981), "Bend theory of river meanders, 1, Linear development," *J. of Fluid Mechanics* 112, pp. 363-377.

Jiafeng, W. et al. (2002), "Adjoint approach to VDA of "on-off" process based on nonlinear perturbation equation," *Progress in Natural Science* 12(11), pp. 185-189.

(56) References Cited

OTHER PUBLICATIONS

Junqing, Y. (1998), "Variational data assimilation in the transport of sediment in river," XP007910712, *Science in China* 41(5), pp. 473-485.

Jurado, F. et al. (1995), "1-D layered media: Part 2, Layer-based waveform inversion," *Geophysics* 60(6), pp. 1857-1869.

Karssenberg, D. et al. (2001), "Conditioning a Process-Based Model of Sedimentary Architecture to Well Data," *J. of Sedimentary Research* 71(6), pp. 868-879.

Kim, J. et al. (1998), "Existence and regularity of weak periodic solutions of the 2-D wave equation," *Nonlinear Analysis, Theory, Methods & Applications* 32(7), pp. 867-870.

Kivva, S.L. (2003), "Refinement of Model Parameters of Radionuclide Transport with Surface Water while Assimilation of Observational Data," *J. of Automation and Information Sciences* 35(5-8), pp. 50-66.

Lancaster S.T. (2002), "A simple model of river meandering and its comparison to natural channels," *Hydrological Processes* 16, pp. 1-26.

Lardner, R.W. (1993), "Optimal control of open boundary conditions for a numerical tidal model," *Computer Methods in Applied Mechanics & Engineering* 102(3), pp. 367-387.

LeDimet, F. et al. (2006), "On optimal solution error in variational data assimilation: theoretical aspects," *Russian J. of Numerical Analysis and Mathematical Modelling* 21(2), pp. 139-152.

Li, R. et al. (2003), "History Matching of Three-Phase Flow Production Data," *SPE Journal* 8(4), pp. 328-340.

Liu, N. et al. (2003), "Automatic History Matching of Geologic Facies," SPE 84594, SPE Annual Tech. Conf. & Exh., 10 pgs.

Lorentzen, R.J. et al. (2006), "A New Approach for Dynamic Optimization of Waterflooding Problems," SPE 99690, 2006 SPE Intelligent Energy Conf. & Exh., 11 pgs.

Marchuk, G.I. et al. (2001), "Mathematical modeling of marine and oceanic currents," *Russian J. of Numerical Analysis and Mathematical Modeling* 16(4), pp. 331-362.

Marler, H.T. et al. (2004), "Survey of multi-objective optimization methods for engineering", *Structural & Multidiscplinary Optimization* 26(6), pp. 369-395.

Masumoto, K. (2005), "Inverse modeling unsaturated heterogeneous media by two-phase pressure derivative matching," *J. of Hydraulic Research* 43(2), pp. 196-201.

Masumoto, K. (2000), "Pressure derivative matching method for two phase fluid flow in heterogeneous reservoir," Proceedings of the SPE Asia Pacific Conf. on Integrated Modeling for Asset Management, pp. 577-584.

Mufti, I.R. (1976), "Finite-Difference Resistivity Modeling for Arbitrarily Shaped Two-Dimensional Structures," *Geophysics* 41(1), pp. 62-78.

Navon, I. et al. (1991), "Optimal control methods and efficient minimization algorithms for variational data assimilation in meterology," Singapore Supercomputing Conf., pp. 272-331.

Nueman, S.P. (1985), "Maximum-likelihood adjoint-state finite-element estimation of groundwater parameters under steady- and nonsteady-state conditions," *Appl. Mathematics and Computation* 17, pp. 405-432.

Piasecki, M. (2004), "Optimal wasteload allocation procedure for achieving dissolved oxygen water quality objectives: I: Sensitivity analysis," *J. of Environmental Engineering* 130(11), pp. 1322-1334.

Piasecki, M. et al. (1999), "Identification of Stream Dispersion Coefficients by Adjoint Sensitivity Method," *J. of Hydraulic Engineering*, pp. 714-724.

Quenes, A. et al. (1992), "Simulated Annealing for Interpreting Gas/Water Laboratory Corefloods," SPE 24870, 67th Ann. Tech. Conf. & Exh., pp. 43-55.

Rodrigues, J.R.P. (2005), "Calculating Derivatives for History Matching in Reservoir Simulators," SPE 93445, 2005 SPE Reservoir Simulation Symposium, 9 pgs.

Sarma, P. et al. (2005), "Implementation of Adjoint Solution for Optimal Control of Smart Wells," SPE 92864, 2005 SPE Reservoir Simulation Symposium, 17 pgs.

Sanders, B. (2000), "Adjoint Sensitivity Analysis for Shallow-Water Wave Control," *J. of Engineering Mechanics*, pp. 909-919.

Scott, T.R. et al. (2007), "Data assimilation for a coastal area morphodynamic model: Morecambe Bay," *Coastal Engineering* 54, pp. 91-109.

Seminara, G. (2006), "Meanders," *J. of Fluid Mechanics* 554, pp. 271-297.

Sidar, M. (1968), "An iterative algorithm for optimum control problems," *Int. Nonlinear Mech.* 3(1), pp. 1-16.

Sun, T. et al. (1996), "A simulation model for meandering rivers," *Water Resources Research*, 32(9), pp. 2937-2954.

Symes, W.W. et al. (1994), "inversion of reflection seismograms by differential semblance analysis: algorithm structure and synthetic examples," *Geophys. Prospecting* 42(6), pp. 565-614.

Tong, A. et al. (1995), "Unified approach for stochastic parameter estimation, experimental design, and reliability analysis in groundwater modeling," 22nd Annual Conf. Integr. Water resources Planning, pp. 895-898.

Vakili, A. et al. (2005), "On the Adjoint of a Nonlinear Diffusion-Convection Equation to Describe Flow in Porous Media," SPE 93566, SPE Middle East Oil and Gas Show and Conference, 12 pgs.

Van Doren, J. et al. (2004), "Reduced-order optimal control of waterflooding using POD," 9th EAGE Math. of Oil Recovery Europe Conference, 8 pgs.

Vos, R.J. et al. (2000), "Integrated data-modelling approach for suspended sediment transport on a regional scale," *Coastal Engineering* 41, XP007910706, pp. 177-200.

Wang, H. (1999), "A family of Eulerian-Lagrangian localized adjoint methods for multi-dimensional advection-reaction equations," *J. of Computational Physics* 152(1), pp. 120-163.

Wang, Z. et al. (1998), "The adjoint Newton algorithm for large-scale unconstrained optimization in meteorology applications," *Computational Optimization and Applications* 10(3), pp. 283-320.

Winguth, A.M.E. et al. (1998), "Paleonutrient data analysis of the glacial using an adjoint ocean general circulation," 26 pgs.

Wu, Z. (2000), "A Newton-Raphson Iterative Scheme for Integrating Multiphase P roduction Data into Reservoir Models," SPE 62846, 2000 SPE/AAPG Regional Meeting, 12 pgs.

Wu, Z. (2003), "A Quantitative Study to Assess the Value of Pressure Data Acquired with In-Situ Permanent Sensors in Complex 3D Reservoir Models Subject to Two-Phase Fluid Flow," SPE 84375, SPE Annual Tech. Conf. & Exh., 15 pgs.

Yeh, W.G. et al. (1990), "Variational sensitivity analysis, data requirements, and parameter identification in a leaky aquifer system," *Water Resources Research* 26(9), pp. 1927-1938.

Yang, Z. (2003), "Variational inverse estimation in a cohesive sediment transport model: An adjoint approach," *Journal of Geophysical Research* 108, pp. 37-1-37-9.

Yang, J. et al. (1998), "Variational data assimilation in the transport of sediment in river," XP007910712, *Science in China* 41(5), pp. 473-485.

Zafari, M. et al. (2005), "Assessing the Uncertainty in Reservoir Description and Performance Predictions with the Ensemble Kalman Filter," SPE 95750, 2005 SPE Annual Technical Conf. & Exh., 18 pgs.

Zakirov, I. et al. (1998), "History Matching for Lauchstaedt Underground Gas Storage," SPE 39994, 1998 SPE Gas Tech. Symposium, 10 pgs.

Zhu, J. et al. (1999), "Optimal Control of Sedimentation in Navigation Channels," *J. of Hydraulic Engineering*, pp. 750-759.

EP Search Report, dated Jan. 5, 2010, EP 09 16 0563.

International Search Report and Written Opinion, dated Feb. 5, 2010, PCT/US2009/066609.

International Search Report & Written Opinion, dated Jan. 26, 2010, PCT/US2009/066608.

European Search Report dated Jan. 21, 2010, EP 09160562.6, 14 Pages.

\* cited by examiner

ADJOINT-BASED CONDITIONING OF PROCESS-BASED GEOLOGIC MODELS

CROSS-REFERENCE TO RELATED APPLICATION

This application is the National Stage of International Application No. PCT/US2009/066609, that published as WO 2010/104537, filed 3 Dec. 2009, which claims the benefit of U.S. Provisional Application No. 61/159,357, filed 11 Mar. 2009, each of which is incorporated herein by reference, in its entirety, for all purposes.

TECHNICAL FIELD

Disclosed techniques and methodologies relate to a method for correlating predicted data with known data, and more particularly, to conditioning data predicted by a process-based model of meandering channel/river systems in fluvial, shallow, or deep water environments in the field of hydrocarbon exploration and production.

BACKGROUND OF THE DISCLOSURE

This section is intended to introduce various aspects of the art, which may be associated with examples of the disclosed techniques. This discussion is believed to assist in providing a framework to facilitate a better understanding of particular aspects of the disclosed techniques. Accordingly, it should be understood that this section should be read in this light, and not necessarily as admissions of prior art.

There is considerable amount of interest in the oil industry and various scientific communities in understanding the underlying physics of sedimentary bodies created by meandering channel systems in the context of oil reservoir formation and geologic modeling. The last decade has witnessed a significant progress in the research and development of evolutionary physics-based sedimentary models, commonly known as "process-based" geological models. One example of such a model is described in U.S. Patent Publication No. 2007/0219725, entitled "A Method For Evaluating Sedimentary Basin Properties By Numerical Modeling Of Sedimentation Processes", by Sun, et al., filed on Aug. 23, 2005. Process-based models are now capable of generating geologically realistic models by time-advancing the governing equations of fluid flow and sedimentation laws from an initial topography. The process- or physics-based approach limits the number of ad-hoc parameters and complies with fundamental laws of nature in its time evolution.

Although process-based modeling is considered to be a great improvement over purely statistical techniques, one also needs to choose the initial and boundary conditions, initial topography, and other model parameters in a manner that the model prediction corresponds closely to available field data. This is not an easy undertaking and integration of field and production data into hydrodynamics-based models is a formidable task, known as "conditioning" in geology. Conditioning of physics-based sedimentary processes is an inverse problem constrained by partial differential equations of fluid motion and sedimentation. Generally speaking, an inverse problem is a problem in which model parameters are derived from known data. Inverse problems are generally difficult to solve for a variety of reasons and are considerably harder for process-based approaches in sedimentary systems because of the scarcity of field data needed to constrain the process.

To facilitate automated methods for conditioning, inverse problems are usually posed as optimization problems and solved with various known methods devised in the field of optimization. These methods fall in two major groups, namely, gradient-based techniques and direct search methods. Direct search methods rely on forward simulations alone to explore the parameter space for the global extremum while gradient-based methods also need sensitivity information with which to locate a local extremum in the vicinity of an initial estimate. The term parameter space, as used herein, refers to a multi-dimensional vector space that has the same dimension as the number of model parameters. The term forward simulation, as used herein, refers to a numerical solution of the governing physical laws in a given spatial and temporal domain for a set of input parameters representing a point in the parameter space.

Optimal control deals with the problem of finding the unknowns of a model constrained by some known data. In geologic problems such as predicting meander bends, the set of unknowns or model parameters may potentially include but are not limited to spatial and temporal distribution of model parameters, initial terrain topography, boundary conditions on the terrain perimeter, time history of terrain deformation and movement, such as subsidence, or the like.

The optimality criterion is embodied in the definition of an objective function (i.e., cost function) which serves as a quantitative measure of the deviation of the model prediction from observed field data. The specific form of the objective function can have a large influence on the outcome of the approach, and physical understanding is required to help guide the selection of candidate objective functions. Gradient-based approaches require gradient (sensitivity) information to explore the parameter space and find a local extremum. An adjoint model may allow computation of sensitivity information and has the distinctive advantage that the computational cost does not scale with the number of unknown parameters. As such, it can be used with relative ease for large-scale conditioning problems.

A simulation model has been designed for the dynamics of meandering channels which provides a framework for studying the interplay between a migrating channel and the changing sedimentary environment created by the channel itself.

In the course of their evolution, meandering channels can encounter a discontinuous and abrupt process known as a cut-off event. This discontinuity in the forward model greatly affects both the accuracy and stability of the adjoint model. In some cases, the adjoint solution stays stable but the accuracy of the sensitivity information is undermined with some components even having the wrong sign. However, in most cases, the adjoint solution, which runs in reverse time, becomes unstable a few time steps prior to the occurrence of the discontinuous event and no sensitivity information can be computed. A proper treatment of the discontinuity is required to ensure numerical stability of the adjoint model and safeguard the accuracy of the obtained sensitivities.

SUMMARY

A method for correlating data predicted by a process- or physics-based geologic model to describe a subsurface region with known data describing the subsurface region is provided. According to the method, data is obtained describing an initial state of the subsurface region and predicting data describing a subsequent state of the subsurface region. The predicted data is compared with the obtained data taking into account whether the predicted data represents a discontinuous event. A sensitivity of the predicted data is determined if the predicted data is not within an acceptable range of the obtained data. The data describing the initial state of the subsurface region is adjusted based on the sensitivity before performing a subsequent iteration of predicting data describing the subsequent state of the subsurface region. A representation of the subsurface region based on the data describing the subsequent state of the subsurface region may be outputted.

The method may be terminated if the predicted data is within the acceptable range of the obtained data. The method may additionally take into account whether the predicted data represents an adaptation by uniformly distributing a series of data points corresponding to a region of curvature of the subsurface region and determining the sensitivity of predicted data at each of the uniformly distributed data points. Taking into account whether the predicted data represents an adaptation may comprise clustering a series of data points corresponding to a region of high curvature of the subsurface region and determining the sensitivity of predicted data at each of the clustered data points. Taking into account whether the predicted data represents a discontinuous event may comprise recognizing co-existing profiles at a time of the event and determining an accurate relationship between adjoint variables before and after the event.

Hierarchical conditioning may be performed by obtaining an acceptable correlation at a coarse level before evaluating the sensitivity level at a fine level. Data describing a subsequent state of the subsurface region may be predicted for a region of the subsurface region for which no data is obtained. Predicting data describing a subsequent state of the subsurface region may be performed via a process-based model. The discontinuous event may be a cut-off. Outputting the representation of the subsurface region may include displaying a visual representation of the subsurface region based on the data describing the subsequent state of the subsurface region.

A method for producing hydrocarbons from an oil and/or gas field is provided. Data is obtained describing an initial state of the oil and/or gas field. Data describing a subsequent state of the oil and/or gas field is predicted. The predicted data is compared with obtained data taking into account whether the predicted data represents a discontinuous event. A sensitivity of the predicted data is determined if the predicted data is not within an acceptable range of the obtained data. Data describing the initial state of the oil and/or gas field is adjusted based on the sensitivity before performing a subsequent iteration of predicting data describing the subsequent state of the oil and/or gas field. Hydrocarbons are extracted from the oil and/or gas field using the predicted data if the predicted data is within an acceptable range of the obtained data.

The method may additionally take into account whether the predicted data represents an adaptation by uniformly distributing a series of data points corresponding to a region of curvature of the subsurface region and determining the sensitivity of predicted data at each of the uniformly distributed data points. Taking into account whether the predicted data represents an adaptation may comprise clustering a series of data points corresponding to a region of high curvature of the subsurface region and determining the sensitivity of predicted data at each of the clustered data points. Taking into account whether the predicted data represents a discontinuous event may comprise recognizing co-existing profiles at a time of the event and determining an accurate relationship between adjoint variables before and after the event.

Hierarchical conditioning may be performed by obtaining an acceptable correlation at a coarse level before evaluating the sensitivity level at a fine level. Data describing a subsequent state of the subsurface region may be predicted for a region of the subsurface region for which no data is obtained. Predicting data describing a subsequent state of the subsurface region may be performed via a process-based model. A visual representation of the oil and/or gas field may be displayed based on the data describing the subsequent state of the oil and/or gas field. Data representative of the sensitivity of the predicted data may be transformed from a physical space to a computational space.

A computer system is disclosed that is adapted to correlate data predicted by a process- or physics-based geologic model to describe a subsurface region with known data describing the subsurface region. The computer system comprises a processor. The computer system may also comprise a tangible, machine-readable storage medium that stores tangible, machine-readable instructions for execution by the processor. The tangible, machine-readable instructions may comprise code that is adapted to obtain data describing an initial state of the subsurface region and code that is adapted to predict data describing a subsequent state of the subsurface region. The tangible, machine-readable instructions may also comprise code that is adapted to compare the predicted data with the obtained data taking into account whether the predicted data represents a discontinuous event. In addition, the tangible, machine-readable instructions may also comprise code that is adapted to determine a sensitivity of the predicted data if the predicted data is not within an acceptable range of the obtained data, and code that is adapted to adjust the data describing the initial state of the subsurface region based on the sensitivity before performing a subsequent iteration of predicting data describing the subsequent state of the subsurface region. The computer system may also include a display for displaying a visual representation of the subsurface region based on the data describing the subsequent state of the subsurface region. The tangible, machine-readable instructions may also include code for outputting this visual representation to the display.

DESCRIPTION OF THE DRAWINGS

Advantages may become apparent upon reviewing the following detailed description and drawings of non-limiting examples in which.

DETAILED DESCRIPTION

Figure 1:
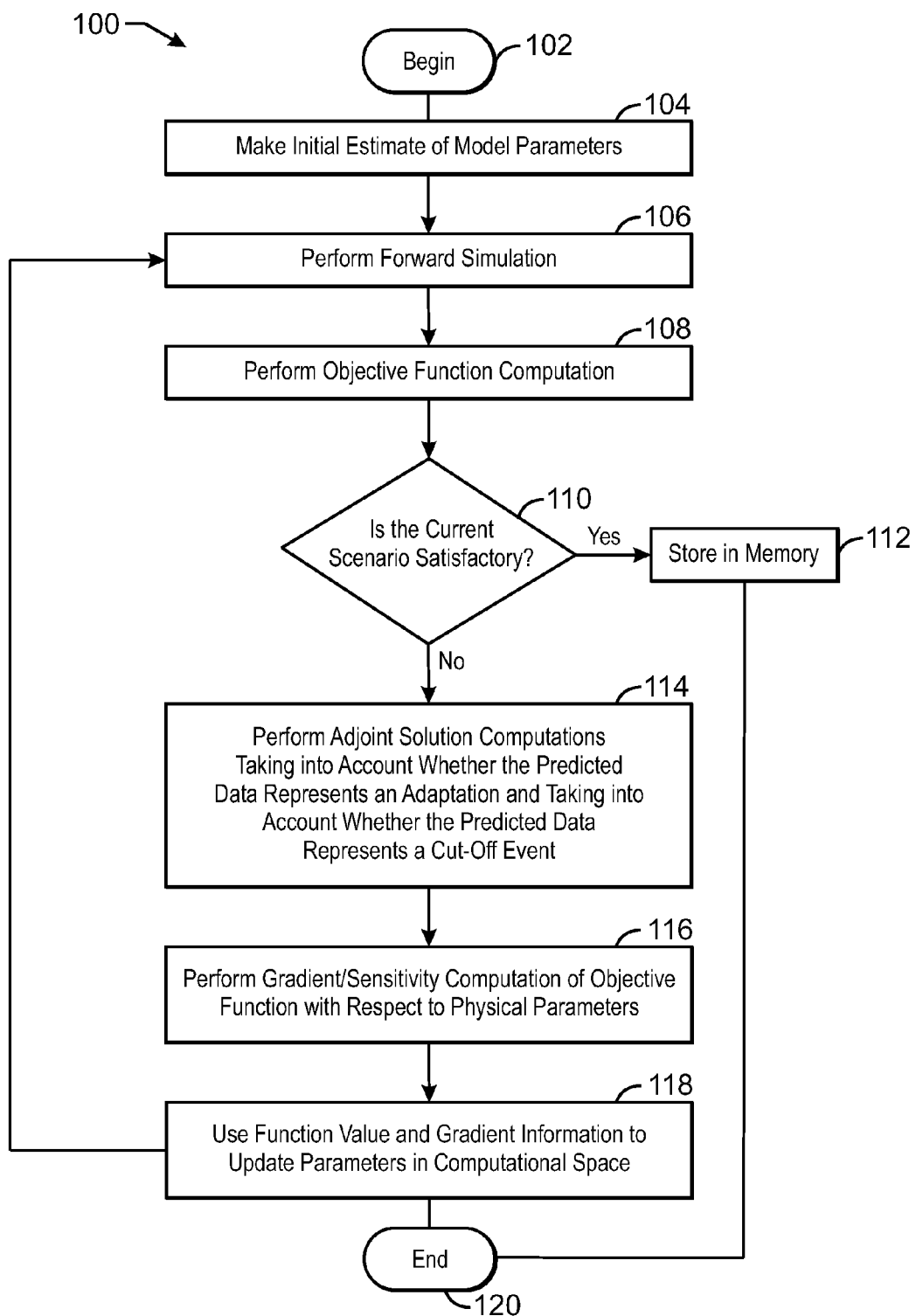
FIG. 1 is a process flow diagram showing a method for conditioning a complex process-based model.

The following description provides examples of the claimed techniques and methodologies. However, the claimed techniques and methodologies are not limited to the specific examples described herein, but additionally include all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, the term "adaptation" refers to uniform or curvature-biased redistribution of points on channel centerline to stabilize and enhance the accuracy of a meandering channel simulation.

As used herein, the terms "adjoint model" refer to a mathematical evaluation of the sensitivity of a predictive model such as a process-based model. Moreover, an adjoint model provides sensitivity data that represents the extent to which the output of a predictive model varies as its input varies. An adjoint model may comprise computing the gradient or sensitivity of the acceptance criteria with respect to model parameters by solving an auxiliary set of equations, known as adjoint equations. The adjoint model is an efficient method for computing sensitivities of large-scale conditioning tasks and, unlike most methods, the computational cost does not scale with the number of conditioning parameters. Many types of adjoint models are known.

As used herein, the term "conditioning" refers to the task of finding one or multiple sets of input parameters for which simulation code such as the process-based model generates outputs consistent with all or some of the data that is known about complex system attributes as observed or measured in nature. Conditioning problems are often very ill-posed due to incomplete field information or data that have the practical effect of constraining the course of the system evolution. Very often, the mathematical formulation of the conditioning process exhibits multiple extrema or discontinuities in its parameter space, rendering the task of navigating the space for finding one or multiple physically meaningful conditioned scenarios extremely difficult. Conditioning may be performed by modifying the way a process-based model predicts data so that the data predicted by the process-based model more closely conforms to known data for a particular aspect of a complex system.

As used herein, the term "convergence" refers to a condition that occurs during an iterative data modeling procedure when predictive output data, or a function measuring error, remains substantially the same between iterations. Convergence may be used to determine an end point for the iterative process by indicating an acceptable level of correspondence between predictive data with known data at a given point in space or time.

As used herein, the term "cut-off event" refers to an abrupt event in the evolution of a channel system when the local sinuosity becomes large enough for adjacent loops to come in contact, in event of which, the channel reconnects at the neck of the loop and abandons the former loop. The terms, cut-off event and neck cut-off, are used interchangeably herein.

As used herein, the terms "direct search" or "exhaustive search" refer to a problem-solving technique that involves systematically enumerating all possible candidates for the solution and checking whether each candidate satisfies the problem's statement.

As used herein, "displaying" is one method of outputting information. Displaying includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

The term "forward simulation" refers to a numerical solution of the governing physical laws in a given spatial and temporal domain.

As used herein, "hydrocarbon extraction" or "extracting hydrocarbons" includes planning the location and timing of new wells, drilling wells, removing hydrocarbons from a hydrocarbon reservoir, managing production from existing wells, predicting production lifetimes of wells or hydrocarbon reservoirs at various extraction rates, and other similar activities. As used herein, "hydrocarbon reservoir" includes reservoirs containing any hydrocarbon substance, including for example one or more than one of any of the following: oil (often referred to as petroleum), natural gas, gas condensate, tar and bitumen.

As used herein, the term "likelihood measure" refers to a function that measures the degree to which predictive data from a predictive model corresponds to known data for a particular aspect of a complex system.

As used herein, the terms "meander" or "meander bend" refer to a sinuous curve, bend, or loop produced by a winding or turning channel.

As used herein, the terms "objective function" or "cost function" refer to a mathematical function that indicates the degree of agreement or disagreement between predicted characteristics of a tentative process-based geologic model and the desired characteristics of an acceptable geologic model from known data. The function commonly is defined so as to attain a value of zero for perfect agreement and a positive value for non-agreement.

As used herein, the term "oxbow lake" refers to a generally crescent-shaped body formed when a meander is cut off from a main channel.

The term "parameter space", as used herein, refers to a multi-dimensional vector space that has the same dimension as the number of model parameters.

As used herein, the terms "process-based model" or "physics-based model" refer to a predictive model that receives initial data and predicts the behavior of a complex physical system such as a geologic system based on the interaction of known underlying scientific processes.

As used herein, the terms "sinuous" or "sinuosity" refer to a river's tendency to move back and forth across the floodplain in an S-shaped pattern over time, measured as the ratio of the distance between two points along the channel centerline to the straight line distance between the two.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. A procedure, step, logic block, process, or the like, is conceived and understood herein to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that discussions herein using terms such as "processing", "computing", "calculating", "determining", "calculating", "predicting", "comparing", "obtaining", "adjusting", "terminating", "taking into account", "distributing", "outputting", "clustering", "recognizing", "performing", "evaluating", "displaying", "conditioning", "describing", "transforming", or the like, refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, various actions could occur concurrently, substantially in parallel, and/or at substantially different points in time.

Methodologies and techniques disclosed herein may be applied to the fields of meandering channels/rivers in fluvial, shallow and deep water environments, geological modeling, physics-based modeling, process-based modeling, geological processes and hydrological model calibration. More specifically, a technique disclosed herein relates to the conditioning of process-based models of meandering channels to known data such as field data. Examples of known data that may be obtained include but are not limited to meander bends, channel migration patterns, seismic data, well logs and cores, outcrop or the like.

Methodologies and techniques disclosed herein may be applied to meandering systems governed by a bend-erosion theory set forth in the following article: Ikeda, S., Parker, G., Sawai, K.; "Bend Theory of River Meanders, 1, Linear Development," Journal of Fluid Mechanics, 112, 363-377, 1981 ("the Ikeda article"). The Ikeda article relates to a forward model comprising computer code based on an appropriate numerical discretization of the bend-erosion theory.

Examples disclosed herein may relate to adjoint-based gradient optimization for conditioning of physics- and process-based sedimentary and geologic models to field observations. Examples of field observable data includes, for example, meander bends, seismic data, well data, core data and outcrop data to generate conditioned geologic models or the like. Moreover, process-based sedimentary models generally represent coupled models of fluid flow and sedimentation laws which govern transport, erosion, and deposition. Disclosed techniques and methodologies may be applied to meandering systems in all environments, including fluvial, shallow and deep water systems.

An evaluation by a process-based model may be constrained by discontinuity information at intermediate times caused by cut-off events. Examples of cut-off events include, for example, neck cut-offs and oxbow lake formations visible in map views and seismic images. For each time step, the forward modeling process may test every meander bend and, with the aid of a background mesh, may check whether the neck has shrunk below a pre-specified critical distance, commonly referred to as the cut-off distance. The cut-off distance is often set at multiples of channel width. When considering the exterior extremities of oxbow lakes as a remainder of the outline of a continuous solution just prior to a catastrophic discontinuous event, an objective function may be augmented by some extra terms at those instants of time. Processes disclosed herein can be applied to parameter spaces with a finite number of discontinuities/abrupt changes and are a methodic extension of solution procedures suitable for continuous processes, such as gradient-based optimization techniques, into the realm of discontinuous processes.

Hierarchical conditioning may be applied to circumvent stalling in unsatisfactory/unphysical local extrema or discontinuities. In hierarchical conditioning, an acceptable match is first obtained with respect to large or coarse features represented by known data. Thereafter, additional conditioning is performed to obtain an acceptable correspondence with smaller, more fine features. In the fine tuning portion of the conditioning process, a more extensive parameter space is explored. As explained in detail below, this fine tuning may be accomplished by adding additional terms and weighting coefficients to an objective function that measure different aspects of the fit of the predicted data with known data. The weighting coefficients may change in the course of the conditioning workflow either interactively by the user, dynamically by the process itself, or based on a predetermined a priori trend.

Examples of methods for changing the weighting coefficients are described in U.S. Provisional Patent Application No. 61/159,359 titled "GRADIENT-BASED WORKFLOWS FOR CONDITIONING OF PROCESS-BASED GEOLOGIC MODELS", by Tao Sun, Kaveh Ghayour, and Matthias Imhof, and filed concurrently herewith. This may also be achieved with minimal amount of effort with a transformation. Depending on the conditioning problem, one may need to use both approaches together. Hierarchical matching, as explained above, is applicable to the conditioning of generic process-based models, in particular, problems with severe discontinuities such as avulsion.

The effectiveness of a process may be demonstrated through conditioning of meandering channels. A transformation or change of variable in an objective function may prevent an evaluation method from stalling in unphysical local extrema. Through the use of this transformation, an operator may have direct control on the space of permissible parameter sets and may change the course of conditioning by changing the parameters of this transformation. Moreover, a method may avoid testing parameter sets that would result in an early partial match with finer-scale details when the large-scale features are still not matched closely.

The input parameters of most geological processes are not measurable or collectable and the field information gathered from seismic, well logs, core, outcrops or meander bends are all of output data type and cannot be simply plugged into the forward model to start a simulation. Accordingly, conditioning is performed to find one or multiple sets of input parameters for which the simulation code that performs disclosed techniques generates outputs consistent with all or some of the above-mentioned attributes as observed or measured in nature. The conditioning of a meandering system is constrained by the physics of flow and sedimentation.

In general, conditioning may be performed via an optimization problem, seeking to find a local extremum of a suitably defined objective function. As set forth above, the objective function measures the misfit between the model prediction and field observation. The choice of objective function has an impact on the success of the process but also on the computational effort needed to compute a satisfactory conditioned scenario.

An adjoint-based gradient optimization may be performed as an iterative process that is initiated at some arbitrary set of model parameters and is guided by the gradient information to a local extremum of the objective function. Numerical treatment of the discontinuous cut-off event may be performed for inverse modeling via an adjoint model. Also, the conditioning process may be constrained with discontinuity information at intermediate times for capturing cut-off processes in the conditioning process. Hierarchical matching may be used as a treatment for stalling in local extrema/discontinuities may be performed as well.

FIG. 1 is a process flow diagram showing a method for conditioning a complex process-based model. The method is generally referred to by the reference number 100. At block 102, the process begins.

At block 104, an initial estimate of process input parameters is made. The input parameters may be used to start off a simulation and produce an evolutionary picture of the outcome of flow and sediment interaction. By way of example, this input can include location data for a channel centerline at the initial time, initial floodplain topography, flow rate at channel inlet, sediment sizes and concentrations or the like.

Two types of input parameters may be provided: hydraulic parameters and initial topography parameters. The hydraulic parameters may be denoted by the column vector $g^H$:

$$g^H = [Q I b C_f A E]^T \quad (1)$$

In equation (1), Q represents the average volumetric flow rate, I represents the average slope of the underlying flood plain, b is the channel half-width, $C_f$ is the friction coefficient, A is a positive constant called a scour factor, and E represents an erosion function. These parameters will be discussed in greater detail below. The hydraulic parameters are considered to be scalars but can also be a function of location and/or time.

The initial topography parameters represent a discretization of the channel centerline at an initial time $t_s$ as a sequence of m points and is denoted by a column vector of length 2m:

$$X_{IC} \equiv X(t_s) \equiv [x_1(t_s) y_1(t_s) x_2(t_s) y_2(t_s) \ldots x_m(t_s) y_m(t_s)]^T \quad (2)$$

The entire parameter space is encapsulated in the column vector g of size 2m+6.

$$g_{2M+6} = [g^H X_{IC}]^T \quad (3)$$

As used in the remainder of this application, g is referred to as "the controls" or "the parameter set". For time-dependent or space dependent hydraulic controls, the vector g may be expanded to accommodate all model inputs. The initial estimate may be based on physical intuition and understanding of the system and can have an immense impact on the conditioning process and convergence to a relevant physically meaningful conditioned scenario.

At block 106, a forward simulation is performed on the initial parameter estimates using a process-based model. The purpose of the forward simulation is to compute the evolution of a channel by modeling the dynamics of the interplay between channel migration and the changing sedimentary environment. In one process, the forward simulation is based on the bend-erosion theory set forth in the Ikeda article, which describes the migration of a meandering channel as a consequence of erosion at the bank where water flows faster than the centerline and an equal amount of deposition at the slower bank. This assumption of no net erosion implies that the average width of the channel can be assumed to remain constant in time and along the length of the entire channel. Under these assumptions, the migration of the channel is modeled by focusing only on the erosion process at the faster bank. The governing equations can be written as:

$$\frac{d\vec{x}}{dt} = E(\vec{x}) u^{sb} \hat{n} \quad (4)$$

$$u_{s0} \frac{\partial u^{sb}}{\partial s} + \left(2 \frac{u_{s0}}{h_0} C_f\right) u^{sb} = b \left[ -u_{s0}^2 \frac{\partial \kappa}{\partial s} + C_f \kappa \left( \frac{u_{s0}^4}{g h_0^2} + A \frac{u_{s0}^2}{h_0} \right) \right] \quad (5)$$

In equations (4) and (5), $\vec{x}$ denotes the position vector of a point on the channel centerline. In addition, $t \in (t_s, t_f)$ represents the time interval in which the governing equations are solved, $E(\vec{x})$ represents the erosion function, $u^{sb}$ represents the excess depth-averaged velocity at the faster bank, $\hat{s}$ and $\hat{n}$ represent the unit tangential and normal vectors to the channel centerline, $u_{s0}$ and $h_0$ represent the average flow velocity and depth, s represents the arclength measured from some arbitrary reference point upstream, $C_f$ represents the friction coefficient, b represents the channel half-width, g represents gravitational acceleration, $\kappa$ represents the local curvature of the channel centerline and A represents a positive constant called the scour factor.

The average flow velocity and depth are given by the St. Venant equation for a uniform flow along a straight channel with the same average slope.

$$u_{s0} = \left(\frac{gQI}{2bC_f}\right)^{\frac{1}{3}} \quad h_0 = \frac{Q}{2bu_{s0}} \tag{6}$$

Geometric quantities are computed from the centerline coordinates by the following general relationships.

$$\kappa = \frac{-x_s y_{ss} + x_{ss} y_s}{(x_s^2 + y_s^2)^{\frac{3}{2}}} \quad \hat{s} = \frac{(x_s, y_s)}{\sqrt{x_s^2 + y_s^2}} \quad \hat{n} = \frac{(-y_s, x_s)}{\sqrt{x_s^2 + y_s^2}} \tag{7}$$

In equation (7), the index s denotes differentiation with respect to the arclength coordinate. Although $u^{sb}$ and $\kappa$ are both functions of time and arclength, $u^{sb}$ is assumed to adjust instantaneously relative to the rate of migration and is computed using the ordinary differential equation (5). The simulation starts at initial time $t_s$, geometrical and average hydraulic parameters are computed, and equation (5) is subsequently solved to obtain the excess velocity along the length of the channel. Equation (4) is then used to update the location of the centerline. This procedure is continued until the final time $t_f$ is reached. The cut-off processes observed in natural meandering channels form an important part of this model. A cut-off event happens when the local sinuosity becomes large enough for adjacent loops to come in contact, causing the channel to reconnect at the neck of the loop and abandon the former loop. A background mesh may desirably keep track of the neighboring points of any point on the centerline and tests every meander bend to check whether the neck has shrunk below a pre-specified critical distance, commonly referred to as the cut-off distance, which is often set at a multiple of the channel width.

At any instant of time, the channel is discretized as a sequence of m points which move about as the channel evolves and is denoted by $$X(t) \equiv [x_1(t) y_1(t) x_2(t) y_2(t) \ldots x_m(t) y_m(t)]^T \tag{8}$$

Equation (5) is a non-homogeneous first order differential equation with constant coefficients. Such systems exhibit a biased dependence on the source term depending on whether the boundary condition is applied at far upstream or downstream. A physically meaningful boundary condition for channels is vanishing excess velocity at some upstream reference point. Therefore, only upwind-biased finite difference derivative stencils can be used for a stable discretization of the left hand side of equation (5). Curvature $\kappa$ is computed by fitting points locally with a fourth order polynomial in arclength s and the $\partial \kappa / \partial s$ term is computed by fitting curvature with a third order upwind-biased polynomial. The excess velocity along the length of the channel is then computed by forward substitution and stored in a column vector $u^{sb}(t)$.

$$u^{sb}(t) = [u_1^{sb}(t) u_2^{sb}(t) \ldots u_m^{sb}(t)]^T \tag{9}$$

The explicit fourth-order accurate Runge-Kutta scheme is used to advance equation (4) in time and compute the new location of the channel centerline. The rate of movement of a point on the centerline depends on the excess velocity which in turn from equation (5) depends on the local curvature at the point and nearby upstream points. As such, points on curved stretches of the channel tend to move at a faster rate than points on relatively straighter parts, resulting in loss of resolution in high-curvature regions and clustering of points near zero curvature regions. This behavior affects the accuracy of the numerical scheme and eventually leads to instability and numerical results approaching infinity for long-term integration of the forward model. To overcome this, two adaptation strategies, namely, uniform redistribution and curvature-adapted distribution, are implemented in the forward model on a periodic basis. In the first adaptation procedure, channel centerline coordinates x and y are fitted with interpolating cubic splines in arclength s, and the original centerline is replaced with a new set of evenly-distributed points along the channel length. A cubic spline is a piecewise third order interpolating function with $C^2$ continuity. In the second strategy, points are periodically clustered in high-curvature regions where the centerline moves and deforms at a much faster rate compared to the more straight stretches of the channel. "High-curvature" in the context of meandering channels refers to curvature of the order of ½b. Sensitivity information may be derived as set forth in detail below for each of the uniformly distributed or clustered points.

With respect to transformation from computation to physical space, the discretized channel centerline at the initial time $X_{IC}$ may need some level of smoothness to be a valid initial condition for the forward simulation as the source term of equation (5) depends on the first, second, and third derivatives of channel profile at any instant of time. Instead of using Cartesian coordinates (x, y), the ($\eta$, $\zeta$) coordinates are introduced as primary variables which are given by the following transformation:

$$x - \alpha x_{ss} + \beta x_{ssss} = \eta$$

$$y - \alpha y_{ss} + \beta y_{ssss} = \zeta \tag{10}$$

As the arclength s at any location depends on the (x, y) coordinates of all points upstream of that point, transformation from ($\eta$, $\zeta$) to (x, y) is an iterative process which for smooth ($\eta$, $\zeta$) converges in few iterations. The coefficients $\alpha$ and $\beta$ control the level of smoothing performed by the transformation from (x, y) to ($\eta$, $\zeta$). For large values of $\alpha$ and $\beta$, the second and fourth derivatives of Cartesian coordinates are penalized heavily and the corresponding physical coordinates tend to be smooth, free of cusps or self intersecting bow-shaped regions. This aspect of the transformation and its effect on the path taken by the conditioning process in the parameter space is referred to as "hierarchical conditioning" herein.

At block 108, an objective function computation is performed on the data predicted by the forward simulation. The objective function measures the deviation between the field data and the forward model prediction. The specific form of the objective function can have a degree of influence on the success or failure of the conditioning process whose goal is to compute one or multiple parameter sets minimizing the misfit between forward model prediction and observed data.

An output of the forward model discussed above is the evolution of the centerline profile. As such, an important aspect is to quantify the deviation between a centerline geometry produced by the process-based model and field observation of meander bends acquired through seismic interpretation, map views, or other means. Field data suitable for conditioning meandering systems usually take the form of one or multiple contiguous or disjoint meander bends and oxbow lake formations. Two measures of distance between two curves which are continuously differentiable with respect to centerline coordinates are outlined below. This differentiability criterion is useful as the gradient of the objective function with respect to centerline coordinates constitutes the final time condition of the adjoint system and drives its solution.

For the first measure, one moves along each target meander bend and at each point measures its distance from the closest point on the centerline geometry. Abstractly, this is equivalent to drawing all the finite number of perpendiculars to the centerline profile which happen to pass through the point on the target meander bend and choosing the smallest distance between them all. Mathematically, such an objective function can be written as:

$$J = \frac{1}{2} \sum_{i=1}^{N_m} \sigma_i \int_0^{S_i^t} h^2(u) du \qquad (11)$$

In equation (11), $N_m$, and $S_i^t$ represent the number of target meander bends and the length of the $i^{th}$ meander loop, respectively, and $\sigma_i$ is the weight associated with the $i^{th}$ target bend. If the flow direction in the channel is known, it makes sense on physical grounds to use larger weights for upstream target bends to prevent the workflow from falling into premature local extrema which can happen if the optimizer seeks match with downstream bends which are controlled by the upstream geometry. The use of equation (11) requires h(u), a measure for minimum distance between a point and a curve represented by discrete points. The simplest and computationally most feasible way is to represent the curve as piecewise straight segments and find the length of the perpendicular from the point in question to every segment. The smallest perpendicular is taken as the distance of the point from the curve. It should be noted that one may also desirably keep a record of the distance of the point from the endpoints of all segments to account for situations when the point in question is closer to two consecutive panels compared to all other panels but its perpendicular foot lies on neither of them. This measure h is differentiable with respect to centerline coordinates, but for complicated and extremely sinuous centerlines, the foot of the perpendicular can jump from a part of the centerline to another part as one moves by a small amount on the target meander bends.

The second objective function, despite being computationally intensive, is relatively more elegant and has a well-behaved gradient with a compact support on the centerline profile. Denoting the length of the $i^{th}$ target meander bend with $S_i^t$, the function looks for a stretch of the centerline profile of length $S_i^t$, which has the smallest point to point squared distance from the $i^{th}$ target bend. In other words, $$J = \sum_{i=1}^{N_m} J_i = \qquad (12)$$

$$\sum_{i=1}^{N_m} \frac{1}{2} \underset{0 < s_i^0 < S - S_i^t}{\text{Min}} \int_0^{S_i^t} \left[ (x(s_i^0 + u) - x_t(u))^2 + (y(s_i^0 + u) - y_t(u))^2 \right] du$$

For each target meander bend, the objective function first finds the starting arclength coordinate $s_i^0$. In computing the integral in (12), the centerline may be fitted with cubic splines in both coordinates and the point $(x(s_i^0+u), y(s_i^0+u))$ which corresponds to point $(x_t(u), y_t(u))$ on the target meander is computed exactly from the spline representation. Computing $s_i^0$ is not an easy task as the integral in equation (12) can have numerous local extrema along the length of the channel. To circumvent this problem, a prescribed number of initial estimates are used. By way of example and not of limitation, eight uniformly distributed points on the centerline may be used, and a steepest descent algorithm may be run for each initial estimate and $s_i^0$ is chosen as the solution that renders the smallest value for the integral.

The definition of the objective function set forth in equation (12) can be modified to include various geometrical features of interest, for example, curvature.

$$J_i = \qquad (13)$$

$$\sum_{i=1}^{N_m} \frac{1}{2} \underset{0 < s_i^0 < S - S_i^t}{\text{Min}} \left\{ \sigma_{1i} \int_0^{S_i^t} \left[ (x(s_i^0 + u) - x_t(u))^2 + (y(s_i^0 + u) - y_t(u))^2 \right] du + \sigma_{2i} \int_0^{S_i^t} \left[ (\kappa(s_i^0 + u) - \kappa_t(u))^2 \right] du \right\}$$

With this modification, the objective function not only searches for the closest stretch of curve to the target, but also a stretch that looks very similar to the target bends in terms of their shape. The relative importance of the terms in equation (13) is determined by the weighting coefficients and is not known a priori.

The objective function definitions put forth in equations (11), (12) and (13) may be used as building blocks of various objective functions depending on specific aspects of a relevant conditioning process performed with a process-based model. The use of a particular objective function is not an essential aspect of the claimed techniques and methodologies.

As set forth above, a meandering channel system may exhibit abrupt changes in its centerline geometry when it undergoes a cut-off event. Such behavior may translate into a parameter space where there exist discontinuities in the value of the objective function when a certain parameter is changed by a small amount. A gradient-based method which is successful when applied to continuous and differentiable objective functions may be used. Therefore, adjustments may be made when modeling systems with finite number of discontinuities in their parameter space.

In the course of a meandering system simulation, smooth evolution of channel geometry is interrupted by a finite number of discontinuous cut-off events that instantly alter the channel geometry by a significant amount. One approach to address this issue is to decompose the process into several time windows over which the evolution is smooth and then try to establish communication between these windows based on the available information. As the observed data or field data is usually scarce and incomplete, coupling of the conditioning workflows in consecutive time windows may be difficult. Alternatively, a process may be adapted to match the observed meander bends at the final time in addition to the oxbow lake formation which was part of the simulation right before the cut-off event occurs. Such an objective function can be written as:

$$J = \sigma_0 J(t_f) + \sum_{j=1}^{N_{cutoffs}} \sigma_j J(t_j^-) \qquad (14)$$

This definition reduces the impact of cut-off discontinuity on the proposed gradient-based workflow. Equation (14) represents a weighted sum of all observed bends at the final time and oxbow lake formations at intermediate times $t_j^-$. Oxbow lakes are usually decipherable from map view or three-dimensional seismic data and by using equation (14), the conditioning process is implicitly constrained by the discontinuity information. If the conditioning process gets close to matching the oxbow lakes, it may be adapted to automatically have the desired cut-off instants later. The weights in equation (14) play an important role in the success of a conditioning process particularly when the initial profile of the channel is considered as unknown and requires some trial runs.

Returning to FIG. 1, at block 110, the output of the objective function computation is evaluated with an acceptance criterion to determine whether data predicted by the process-based model is sufficiently accurate with respect to known data. If the quality of the fit is acceptable at block 110, the current parameter set is stored in memory, as shown at block 112. Alternatively or additionally, a representation of the channel or other analyzed geologic region may be displayed or otherwise outputted to assist or guide hydrocarbon extraction activities or the sequestration of carbon-based substances such as carbon dioxide. The process flow then ends, as shown at block 120.

If, at block 110, the output of the objective function indicates that the current model prediction is not sufficiently accurate with respect to known data, adjoint solution computations are performed, as shown at block 114. The adjoint solution computations are performed taking into account whether the predicted data represents a cut-off event, as set forth above.

There are typically two approaches to formulation of adjoint models for systems governed by partial differential equations. The first approach is known as the optimize-then-discretize (continuous) approach. In the optimize-then-discretize (continuous) approach, optimality conditions are derived analytically from governing equations of the forward model and are then discretized with a suitable numerical scheme. The second approach is known as the discretize-then-optimize (discrete) approach. In the discretize-then-optimize (discrete) approach, optimality conditions are applied directly to the discretized forward model. The gradient/sensitivity may be computed using the second approach, while the first approach may provide an advantage that the derived adjoint system is independent of the discretization scheme used in the forward simulation.

The right hand side of the channel modeling equation set forth above as equation (5) involves curvature and its tangential derivative, which are both highly nonlinear functions of centerline coordinates. The derivation of the continuous adjoint model may relate to several consecutive linearizations and turns out to be extremely lengthy. A discrete approach may be used in which the index notation is used to render the derivation less complex. The forward model can be written in the compact form $$\frac{dX}{dt} = R(X, u^{sb}, g^H) \quad t = t_s + jh \quad j \in [0, N] \quad (15)$$
$$Du^{sb} = H \quad X(t_s) \equiv X_0 = X_{IC}$$

Column vectors $u^{sb}(t)$ and $X(t)$ are of size m and 2m, respectively, and are defined previously in equations (8) and (9), with m being the number of discrete points representing the channel centerline at any instant of time. The vector $g^H$ denotes the hydraulic parameters as defined in equation (1).

The components of $R_{[2m \times l]}$ may be given by $$\begin{bmatrix} R_{2i-1} \\ R_{2i} \end{bmatrix} = \begin{bmatrix} Eu_i^{sb} n_{x_i} \\ Eu_i^{sb} n_{y_i} \end{bmatrix} \quad i = 1, \ldots, m \quad (16)$$

The lower triangular matrix D may have a lower bandwidth of five and may result from a fourth-order accurate upwind discretization of the left hand side of equation (5) along the tangential direction. The array H is the right-hand side of the excess velocity equation and includes the nonlinearities. The control g, as defined previously in equation (3), augments the hydraulic controls $g^H$ with the initial configuration $X_{IC}$ and encapsulates all problem parameters in one single entity.

An explicit fourth-order Runge-Kutta scheme may be used to integrate equation (15) in time for N time steps of a priori known size h. Using the notation known as a Butcher tableau, the integration procedure can be written concisely as:

$$X_{n+1} - X_n = h \sum_{i=1}^{s} b_i R(Y_{ni}, u_{ni}^{sb}, g^H) \quad (17)$$

$$Y_{ni} - X_n = h \sum_{j=1}^{s} a_{ij} R(Y_{nj}, u_{nj}^{sb}, g^H)$$

In equation (17), s denotes the number of stages, index n ranges from 0 to N-1, $Y_{ni}$ are intermediate Runge-Kutta stages for $i=1, \ldots, s$, and the weights $b_i$'s and coefficients $a_{ij}$'s are given by:

$$a = \begin{bmatrix} 0 & 0 & 0 & 0 \\ \frac{1}{2} & 0 & 0 & 0 \\ 0 & \frac{1}{2} & 0 & 0 \\ 0 & 0 & 1 & 0 \end{bmatrix} \quad (18)$$

$$b = \begin{bmatrix} \frac{1}{6} & \frac{1}{3} & \frac{1}{3} & \frac{1}{6} \end{bmatrix}$$

Among the family of Runge-Kutta schemes, the four-stage explicit fourth-order Runge-Kutta achieves fourth-order accuracy in the coupled optimal control problem.

In summary, the forward model may be written as the following.

$$X_{n+1} - X_n - h \sum_{i=1}^{s} b_i R(Y_{ni}, u_{ni}^{sb}, g^H) = 0 \quad (19)$$

$$Y_{ni} - X_n - h \sum_{j=1}^{s} a_{ij} R(Y_{nj}, u_{nj}^{sb}, g^H) = 0$$

$$Du^{sb} - H = 0$$

$$X_0 - X_{IC} = 0$$

A goal may be to find the gradient of a general objective function J with respect to all problem parameters $g=[g^H \times X_{IC}]^T$. The objective function can in principle depend not only on the final output of the system at time $t_f$ but also on intermediate system outputs. Hence, the objective function may be written as $J \equiv J(X_N, X_p)$ with $X_N$ and $X_p$ being the system outputs at the final time $t_f = t_s + Nh$ and intermediate time $t_p = t_s + Ph$.

System outputs at times $t_f$ and $t_p$ are not known explicitly in terms of parameters g and one has to somehow use the implicit link between parameters and system output, i.e., the discrete form of the forward model over the time horizon of interest $(t_s, t_f)$. Noting that the set of equations (19) is valid for any control g, one can define an equivalent objective function $\tilde{J}$, known as the augmented objective function, by adding a linear combination of every equation in the set of equations (19) to the original objective function.

$$\tilde{J} = J(X_N, X_P) + \sum_{n=0}^{N-1} \lambda_{n+1}^T \left\{ X_{n+1} - X_n - h\sum_{i=1}^{s} b_i R(Y_{ni}, u_{ni}^{sb}, g^H) \right\} + \qquad (20)$$

$$\sum_{n=0}^{N-1} \sum_{i=1}^{s} \Lambda_{ni}^T \left\{ Y_{ni} - X_n - h\sum_{j=1}^{s} a_{ij} R(Y_{nj}, u_{nj}^{sb}, g^H) \right\} +$$

$$\sum_{n=0}^{N-1} \sum_{i=1}^{s} \Psi_{ni}^T \{D_{ni} u_{ni}^{sb} - H_{ni}\} + \theta^T (X_0 - X_{IC})$$

The newly introduced variables $\lambda_1, \lambda_2, \ldots, \lambda_N, \Lambda_{01}, \Lambda_{02}, \ldots, \Lambda_{0s}, \Lambda_{11}, \Lambda_{12}, \ldots, \Lambda_{1s}, \ldots, \Lambda_{N-1,1}, \Lambda_{N-1,2}, \ldots, \Lambda_{N-1,s}$, and $\theta_1$ are column vectors of size 2m while $\Psi_{01}, \Psi_{02}, \ldots, \Psi_{0s}, \Psi_{11}, \Psi_{12}, \ldots, \Psi_{1s}, \ldots, \Psi_{N-1,1}, \Psi N_{N-1,2}, \ldots, \Psi_{N-1,s}$ are of size m. These variables are commonly referred to as the Lagrange variables or multipliers. The adjoint variable corresponding to the initial profile of the channel, $X_0$, is $\theta$ and $\lambda_0$ is not defined.

The original problem had g as its independent variables and all other variables appearing in the right hand side of equation (20) were dependent variables, but with the introduction of the Lagrange variables, the augmented problem now has additional independent variables, namely, $X_n$ for n=1, ..., N, $u_{ni}^{sb}$ for n=0, ..., N−1 and i=1, ..., s, $Y_{ni}$ for n=0, ..., N−1 and i=1, ..., s. Next, all independent variables are perturbed to find the corresponding variation of the augmented objective function.

$$\delta\tilde{J} = \nabla_{X_N} J^T \delta X_N + \nabla_{X_P} J^T \delta X_P + \qquad (21)$$

$$\sum_{n=0}^{N-1} \lambda_{n+1}^T \left\{ \delta X_{n+1} - \delta X_n - h\sum_{i=1}^{s} b_i \left\{ \frac{\partial R}{\partial X}\bigg|_{Y_{ni}} \delta Y_{ni} + \frac{\partial R}{\partial u^{sb}}\bigg|_{u_{ni}^{sb}} \delta u_{ni}^{sb} + \frac{\partial R}{\partial g^H}\bigg|_{g^H} \delta g^H \right\} \right\} + \sum_{n=0}^{N-1} \sum_{i=1}^{s} \Lambda_{ni}^T \left\{ \delta Y_{ni} - \delta X_n - h\sum_{j=1}^{s} a_{ij} \left\{ \frac{\partial R}{\partial X}\bigg|_{Y_{nj}} \delta Y_{nj} + \frac{\partial R}{\partial u^{sb}}\bigg|_{u_{nj}^{sb}} \delta u_{nj}^{sb} + \frac{\partial R}{\partial g^H}\bigg|_{g^H} \delta g^H \right\} \right\} + \sum_{n=0}^{N-1} \sum_{i=1}^{s} \Psi_{ni}^T \left\{ D_{ni} \delta u_{ni}^{sb} - \frac{\partial H}{\partial X}\bigg|_{Y_{ni}} \delta Y_{ni} - \frac{\partial H}{\partial g^H}\bigg|_{g^H} \delta g^H \right\} + \sum_{n=0}^{N-1} \sum_{i=1}^{s} \delta Y_{ni}^T \sum_{l=1}^{M} \sum_{p=1}^{M} \Psi_{ni,l} \frac{\partial D_{ni,lp}}{\partial X}\bigg|_{Y_{ni}} u_{ni,p}^{sb} +$$

$$\sum_{n=0}^{N-1} \sum_{i=1}^{s} \delta g^{H^T} \sum_{l=1}^{M} \sum_{p=1}^{M} \Psi_{ni,l} \frac{\partial D_{ni,lp}}{\partial g^H}\bigg|_{g^H} u_{ni,p}^{sb} + \theta^T (\delta X_0 - \delta X_{IC})$$

The next step in the derivation is to assign appropriate values to the introduced Lagrange variables such that variations of all variables on the right-hand side vanish except for the original controls of the problem, i.e., $\delta g = [\delta g^H \; \delta X_{IC}]^T$. It can be shown that the adjoint system can be computed from following sets of equations by marching back in time from time step N.

$$\lambda_N = -\nabla_{X_N} J \qquad (22)$$

$$D_{ni}^T \Psi_{ni} = hb_i \frac{\partial R}{\partial u^{sb}}\bigg|_{u_{ni}^{sb}}^T \tilde{\Lambda}_{ni}$$

$$F_{nj} = hb_j \frac{\partial R}{\partial X}\bigg|_{Y_{nj}}^T \tilde{\Lambda}_{nj} + \frac{\partial H}{\partial X}\bigg|_{Y_{nj}}^T \Psi_{nj} - \Xi_{nj}$$

$$\tilde{\Lambda}_{ni} = \lambda_{n+1} + \sum_{j=1}^{s} \frac{a_{ji}}{b_i} F_{nj}$$

$$\lambda_n = \lambda_{n+1} + \sum_{i=1}^{s} F_{ni} - \delta_{nP} \nabla_{X_P} J$$

$$\theta = \lambda_1 + \sum_{i=1}^{s} \Lambda_{0i} = \lambda_1 + \sum_{i=1}^{s} F_{ni}$$

The adjoint system represented by the set of equations (22) involves some auxiliary variables which are defined below.

$$\tilde{\Lambda}_{ni} = \lambda_{n+1} + \sum_{j=1}^{s} \frac{a_{ji}}{b_i} \Lambda_{nj} \qquad (23)$$

$$\Xi_{ni} \equiv \sum_{l=1}^{M} \sum_{p=1}^{M} \Psi_{ni,l} \frac{\partial D_{ni,lp}}{\partial X}\bigg|_{Y_{ni}} u_{ni,p}^{sb}$$

$$\Omega_{ni} \equiv \sum_{l=1}^{M} \sum_{p=1}^{M} \Psi_{ni,l} \frac{\partial D_{ni,lp}}{\partial g^H}\bigg|_{g^H} u_{ni,p}^{sb}$$

$$F_{nj} \equiv hb_j \frac{\partial R}{\partial X}\bigg|_{Y_{nj}}^T \tilde{\Lambda}_{nj} + \frac{\partial H}{\partial X}\bigg|_{Y_{nj}}^T \Psi_{nj} - \Xi_{nj}$$

This formulation may be used for a Runge-Kutta scheme, implicit or explicit, and regardless of its number of stages, but does not necessarily have the optimal order of accuracy for the optimal control problem, and the solution of the discrete problem can diverge from the solution of the continuous problem. For an explicit fourth-order Runge-Kutta with weights and coefficients given in the equation (18), the Lagrange variables at the intermediate Runge-Kutta stages are given by:

$$\tilde{\Lambda}_{n4} = \lambda_{n+1} \qquad (24)$$

$$\tilde{\Lambda}_{n3} = \lambda_{n+1} + 3F_{n4}$$

$$\tilde{\Lambda}_{n2} = \lambda_{n+1} + \frac{3}{2} F_{n3}$$

$$\tilde{\Lambda}_{n1} = \lambda_{n+1} + 3F_{n2}$$

In performing forward modeling, periodical adaptation for numerical accuracy and stability of the forward model may be needed. Adaptation results in redistribution of nodal points on the centerline and is taken into account in the adjoint solution to avoid deterioration of the adjoint solution accuracy and ultimately the accuracy of the gradient of the objective function with respect to the conditioning parameter set. Without the prescribed treatment, the computed gradient may not be accurate with some components having even the wrong sign compared to the exact sensitivities. The treatment described below ensures that the computed gradient information is in good agreement with second, fourth, and sixth order brute-force finite difference sensitivities. In the following discussion, the treatment for a uniform redistribution of points as described in a forward modeling process is outlined.

In uniform redistribution, channel centerline coordinates x and y are fitted with interpolating cubic splines in arclength s, and the original centerline is replaced with a new set of evenly-distributed points along channel length. At the instant of time, say p, that adaptation occurs, the two are distinguished by denoting the unadapted or raw centerline by $X_r^p$ and the adapted centerline configuration by $X_a^p$, both coexisting at time step p. As the adjoint solution is marched back in time, the variation of centerline coordinates at time step p+1, $\delta X^{p+1}$, is related to $\delta_a^p$ as outlined above for any two generic time steps and, similarly, in the next step $\delta X_a^p$ is related to $\delta X^{p-1}$. However, in the forward simulation, the outcome of stepping in time from p−1 to p is $X_r^p$ and not $X_a^p$. If $\lambda_a^p$ and $\lambda_r^p$ are the adjoint variables at time p after and before adaptation, respectively, it is not hard to see from the equation (21) that $$\lambda_r^p - \left(\frac{\partial X_a^p}{\partial X_r^p}\right)^T \left(\lambda^{p+1} + \sum_{i=1}^{s} \Lambda_{pi}\right) = \lambda_r^p - \left(\frac{\partial X_a^p}{\partial X_r^p}\right)^T \lambda_a^p = 0 \quad (25)$$

The Jacobian in equation (25) measures the rate of change of an adapted point when the unadapted profile is perturbed by an infinitesimal amount. This correction desirably restores the accuracy of the adjoint solution.

The following discussion relates to addressing cut-off conditions. When a cut-off happens, the cut-off loop is instantaneously excluded from centerline profile and its effect on future evolution of the profile is lost. This abrupt behavior can cause serious problems for the application and validity of an adjoint approach which relies on existence of at least the first order derivatives of the objective function with respect to the parameter space. The first requisite is to make the cut-off process amenable to differentiation. Cut-off happens when the local sinuosity becomes large enough for adjacent loops to come in contact, causing the channel to reconnect at the neck of the loop and abandon the former loop. At every time step, a modeling process searches the centerline with the aid of a background mesh to find two points on the centerline which satisfy two requirements. First, the distance between the points should be smaller than the prescribed threshold for neck cut-off, and second, the arclength distance should be larger than the perimeter of a semi-circle with a diameter equal to the prescribed cut-off threshold. After finding two points with these characteristics, the common practice in forward modeling is to connect the two and omit the points lying in between. In this approach, the continuity of the unit normal (a unit vector normal to the centerline of the channel) at the neck and its vicinity is lost and the simulation experiences a non-physical transient that is primarily due to unresolved first and higher order centerline derivatives. As such, this treatment of the cut-off event is not suitable for conditioning, particularly, in gradient-based approaches. These shortcomings can be improved by finding the location of the cut-off and, second, connecting the cut-off points by a higher order polynomial that merges with the remainder of the centerline smoothly and has continuous first derivatives. In order to find the neck location more accurately, the profile before cut-off may be fitted with cubic splines for both coordinates. After finding the neck endpoints, as described earlier, a modeling process may employ a gradient-based iterative procedure to compute the minimum distance between the four cubic segments having one of the two points as an endpoint. The cut-off now occurs at the computed mid-panel points which correspond to a cubic spline representation of the centerline. After omitting the cut-off loop, a cubic function, represented by a prescribed number of points, typically about four to eight points, is added to the centerline profile which passes through the computed mid-panel endpoints and has the same tangent vector as the profile before cut-off.

The following discussion relates to a treatment of the cut-off process in adjoint computations. To illustrate the approach, assume that three distinct profiles coexist at the instant when a cut-off occurs. The profile right before cut-off is denoted by $X^{bc}$ and the profile right after eliminating the cut-off loop and inserting the merging cubic segment is denoted by $X^{ac}$. $X^{ac}$ does not necessarily have the same number of points. The final profile X=(x, y) is the result of fitting $X^{ac}$ with cubic splines in both coordinates and computing the location of m uniformly distributed points on the spline representation. Similar to the above discussion relating to the proper treatment of adaptation in adjoint calculations, the adjoint variable $\lambda^{bc}$ corresponding to $X^{bc}$ is found through two similar successive transformations.

At block 116, a gradient or sensitivity computation of the objective function is performed with respect to physical parameters estimated at block 104. With the adjoint system defined as in the set of equations (22), the variation of the augmented objective function set forth in equation (21) reduces to $$\langle \nabla_{g^H} \tilde{J}, \delta g^H \rangle = \sum_{n=0}^{N-1} \sum_{i=1}^{s} \left[ -hb_i \tilde{\Lambda}_{ni}^T \frac{\partial R}{\partial g^H}\bigg|_{g^H} - \Psi_{ni}^T \frac{\partial H}{\partial g^H}\bigg|_{g^H} + \Omega_{ni}^T \right] \delta g^H \quad (26)$$

$$\langle \nabla_{X_{IC}} \tilde{J}, \delta X_{IC} \rangle = \theta_1^T = \lambda_1^T + \sum_{i=1}^{s} \Lambda_{0i}^T = \lambda_0^T \quad (27)$$

The following discussion relates to the transformation of gradient data from a physical space to a computational space. At this stage of the process 100, the gradient of the objective function with respect to the physical parameters $g_{2M+6} \equiv [g^H \, X_{IC}]^T$ is known. Gradient information obtained as set forth above may be used to update hydraulic parameters and the initial centerline profile $X_{IC}$, as shown at block 118. The updated profile may desirably have a certain level of smoothness in order to be a viable initial condition for the high-order forward modeling process 106. The updated initial profile estimated at block 104 may be limited to exist only in a functional space that exhibits certain level of smoothness. Moreover, this may be achieved by a transformation inspired by an $H_2$ representation of the gradient that can be written as:

$$x - \alpha x_{ss} + \beta x_{ssss} = \eta$$

$$y - \alpha y_{ss} + \beta y_{ssss} = \zeta \quad (28)$$

The physical coordinates (x, y) are now smoother than ($\eta$, $\zeta$) which are now used as the primary variables of the conditioning problem. Hence, it is desirable to find the gradient with respect to primary variables. This is done in a discrete fashion by discretizing equation (28) using the finite difference discretization described above.

$$Ax = \eta$$
$$Ay = \zeta \quad (29)$$

The matrix A depends on the arclength coordinate s which in turn is a function of the centerline coordinates. Next, the Jacobians $$\frac{\partial \eta}{\partial x}, \frac{\partial \eta}{\partial y}, \frac{\partial \zeta}{\partial x}, \text{ and } \frac{\partial \zeta}{\partial y}$$

are determined by examining equation (29).

$$\delta\eta_i = \delta x_i - \alpha\delta(x_{ss})_i + \beta\delta(x_{ssss})_i$$
$$\delta\zeta_i = \delta y_i - \alpha\delta(y_{ss})_i + \beta\delta(y_{ssss})_i \quad (30)$$

Variations of the derivatives in the equations (30) may be computed by accounting for the dependence of the arclength coordinate on centerline coordinates. A five-point stencil may be used to compute the derivatives in internal points. In such a case, the desired Jacobians may turn out to be pentadiagonal matrices. Using a chain rule with the notation $$\left(\frac{\partial \eta}{\partial x}\right)_{ij} = \frac{\partial \eta_j}{\partial x_i}$$

for the Jacobians, the gradients in the two spaces can be related by the following relationship.

$$\nabla_x J = \frac{\partial \eta}{\partial x}\nabla_\eta J + \frac{\partial \zeta}{\partial x}\nabla_\zeta J \quad (31)$$
$$\nabla_y J = \frac{\partial \eta}{\partial y}\nabla_\eta J + \frac{\partial \zeta}{\partial y}\nabla_\zeta J$$

$\nabla_\eta J$ and $\nabla_\zeta J$ can now be computed from the above using an LU factorization. Given the function value and its gradient at a point in the parameter space, a wide range of optimization algorithms can be used to update the current parameter data.

Figure 2:
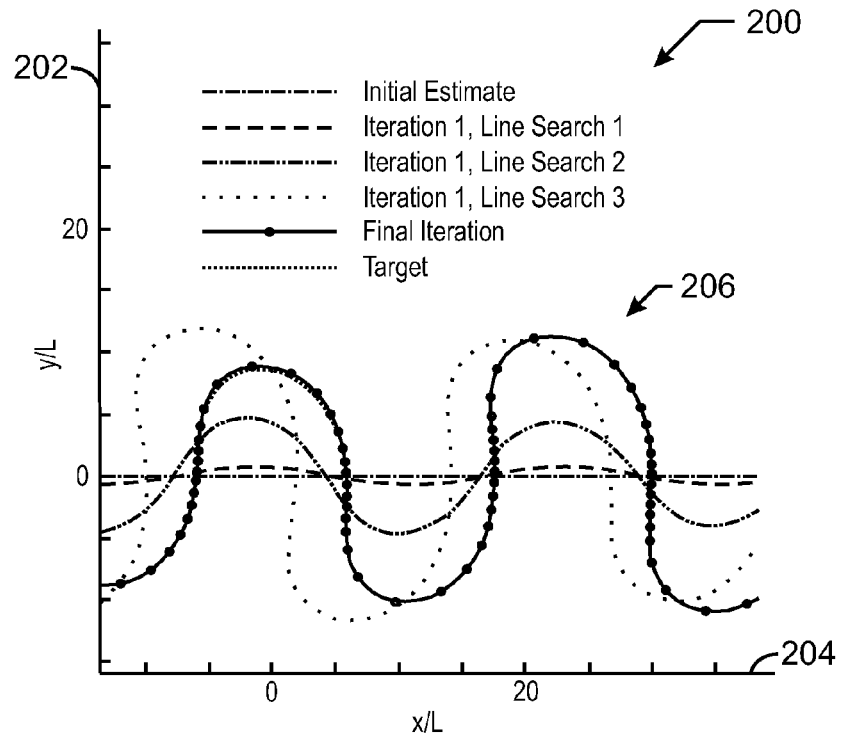
FIG. 2 is a graph that is useful in explaining the evolution of a forward code prediction.

FIG. 2 is a graph that is useful in explaining the evolution of a forward modeling process. Graph 200 includes a y-axis 202, which represents the non-dimensionalized y-coordinate of the channel centerline. X-axis 204 represents the non-dimensionalized x-coordinate. Graph 200 comprises a family of curves 206. The definition of each one of the family of curves 206 is set forth in the legend shown in graph 200. In particular, graph 200 includes a target set of meander bends. An initial guess is made and subsequent forward modeling iterations are performed. The final iteration of data provided closely conforms to the target meander bends.

To produce the results shown in FIG. 2, a process is assigned with finding the channel profile at the initial time $t_s$ such that at the final time $t_f$ the channel centerline matches the target profile. The target profile is the whole channel profile and hydraulic parameters are assumed to be known a priori. The target profile is synthetic data extracted from a truth model run. A truth model run is a forward simulation with some known model parameters producing the target data used for validation. The initial estimate for the unknown initial profile is chosen to be a straight channel. The objective function is formulated using the simpler formulation of equation (11) for one piece of target data that spans the whole length of the channel. FIG. 2 shows the evolution of the forward model prediction at the final time as the workflow proceeds. The first forward simulation (iteration 1, line search 1) results in a straight channel without any sinuosity. However, after one gradient computation (one adjoint solution based on the straight channel forward simulation), the process produces the next iterate (iteration 1, lines search 2), which is clearly sinuous but is not at the right location. As the process proceeds, the locations of meander bends are further improved and, eventually, the target profile is matched virtually point by point as depicted in FIG. 3.

Figure 3:
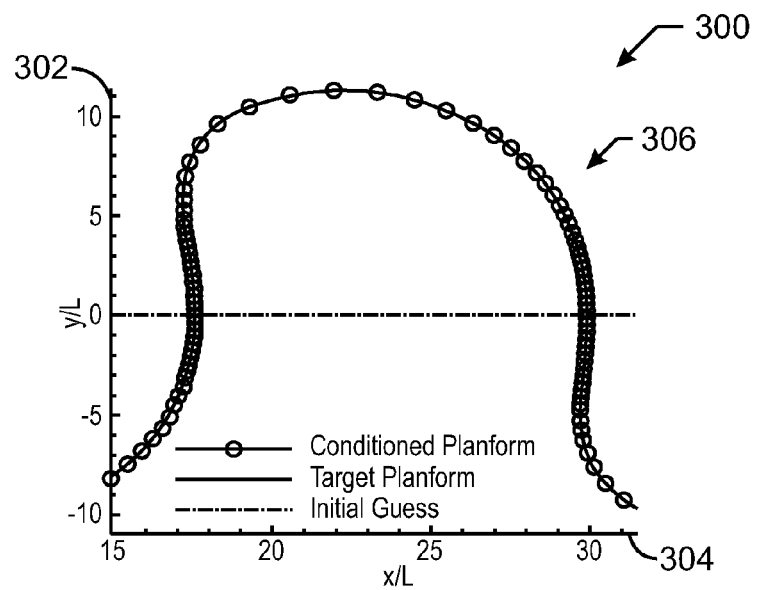
FIG. 3 is a graph showing a close-up view of a portion of the data shown in FIG. 2.

FIG. 3 is a graph showing a close-up view of a portion of the data shown in FIG. 2. Graph 300 includes a y-axis 302, which represents the non-dimensionalized y-coordinate. X-axis 304 represents the non-dimensionalized x-coordinate. Graph 300 comprises a family of curves 306. The definition of each one of the family of curves 306 is set forth in the legend shown in graph 300. The family of curves 306 comprises an initial guess and a target planform. A conditioned planform shows that data provided closely corresponds to a target meander bend represented by the target planform. The obtained results shown in FIG. 3 illustrate the viability of a process for finding one conditioned scenario. As the gradient-based conditioning is local in scope and converges to the nearest local extremum, the conditioned scenario would depend on the initial estimate. A relevant concern is to assess the extent of which conditioned scenarios deviate from the truth model as a function of the initial estimate. In order to answer this question, two conditioning runs may be performed. The first conditioning run is described above with reference to FIG. 2 in which a straight channel is posited as the initial estimate. For the second run, an initial estimate that is very close to the truth model is used.

Figure 4:
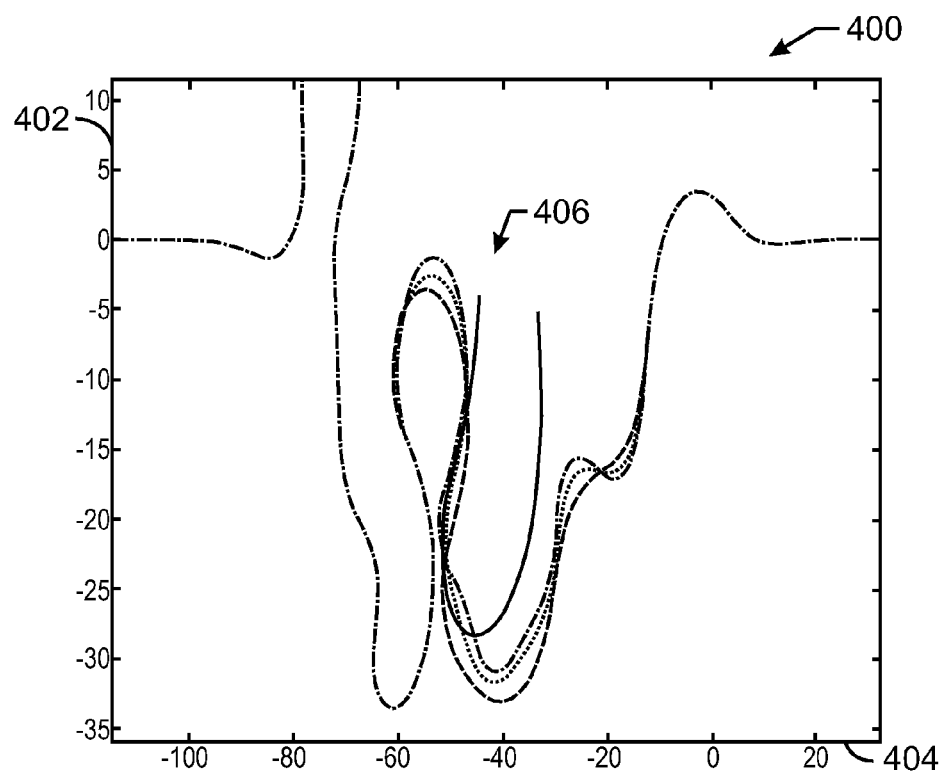
FIG. 4 is a graph that is useful in explaining stalling of a method of conditioning in a non-acceptable local extremum.

FIG. 4 is a graph that is useful in explaining what is meant by stalling in a non-acceptable local extremum. Graph 400 includes a y-axis 402, which represents the non-dimensionalized y-coordinate. X-axis 404 represents the non-dimensionalized x-coordinate. A family of curves 406 shows the results of a forward modeling process in predicting target data (solid line) for a plurality of predicted data (dashed lines). Each of the predicted data traces is based on a different initial estimate of parameters. Those of ordinary skill in the art will appreciate that none of the predicted data is particularly close to the target data. Three successive iterates (dashed lines) form a highly sinuous bend upstream of the target meander bend (solid line). Any further change in the controls results in a cut-off and the quality of match with the target deteriorates appreciably.

Moreover, the data shown in FIG. 4 represents an example of a process of forward modeling stalling in a premature non-acceptable local extremum.

Figure 5:
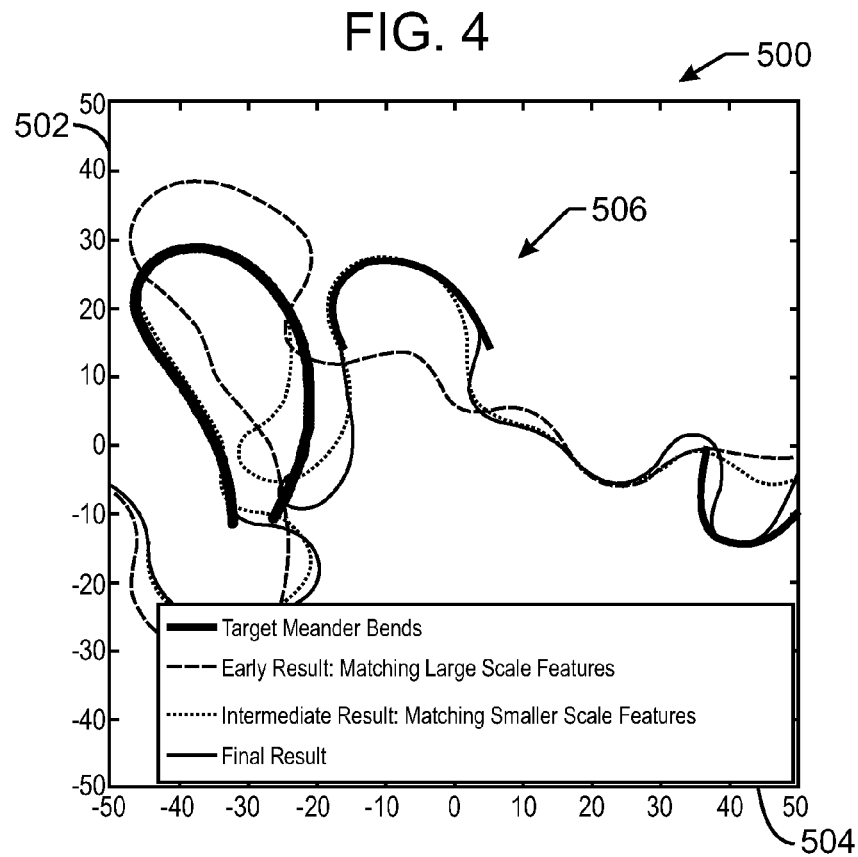
FIG. 5 is a graph that is useful in explaining the effect of hierarchical conditioning on an evolution of a conditioned scenario.

FIG. 5 is a graph that is useful in explaining the effect of hierarchical conditioning on an evolution of a conditioned scenario. Moreover, the data shown in FIG. 5 illustrates how undesirable results shown in FIG. 4 may be avoided by using hierarchical conditioning according to disclosed techniques. Graph 500 includes a y-axis 502, which represents the non-dimensionalized y-coordinate. X-axis 504 represents the non-dimensionalized x-coordinate. Graph 500 comprises a family of curves 506. The definition of each one of the family of curves 506 is set forth in the legend shown in graph 500.

The data shown in FIG. 5 relates to target data for three meander bends (solid lines). It is assumed that the hydraulic parameters are known and that an unknown is the location of the channel centerline at the initial time $t_s$. The initial estimate for the position of the centerline is chosen deliberately to be a straight channel to assess the performance of the forward model predictive process for complicated scenarios where the evolution of the system is interrupted with the abrupt discontinuous cut-off processes. Without hierarchical conditioning, as described above, the conditioning process may stall in an unsatisfactory local extremum (See FIG. 4). The data shown in FIG. 5 demonstrate a successful implementation of the hierarchical matching approach. By way of example, for the data representative of an early result, large values of coefficients $\alpha$ and $\beta$ in equation (10) are used to find a gross match with the observed data (target meander bend data). In later stages, as shown by the data corresponding to the intermediate and final results, the coefficients of equation (10) are set to smaller values to allow the centerline to acquire larger curvature, without being penalized excessively by the transformation, and match finer more curved details of the target data.

Figure 6:
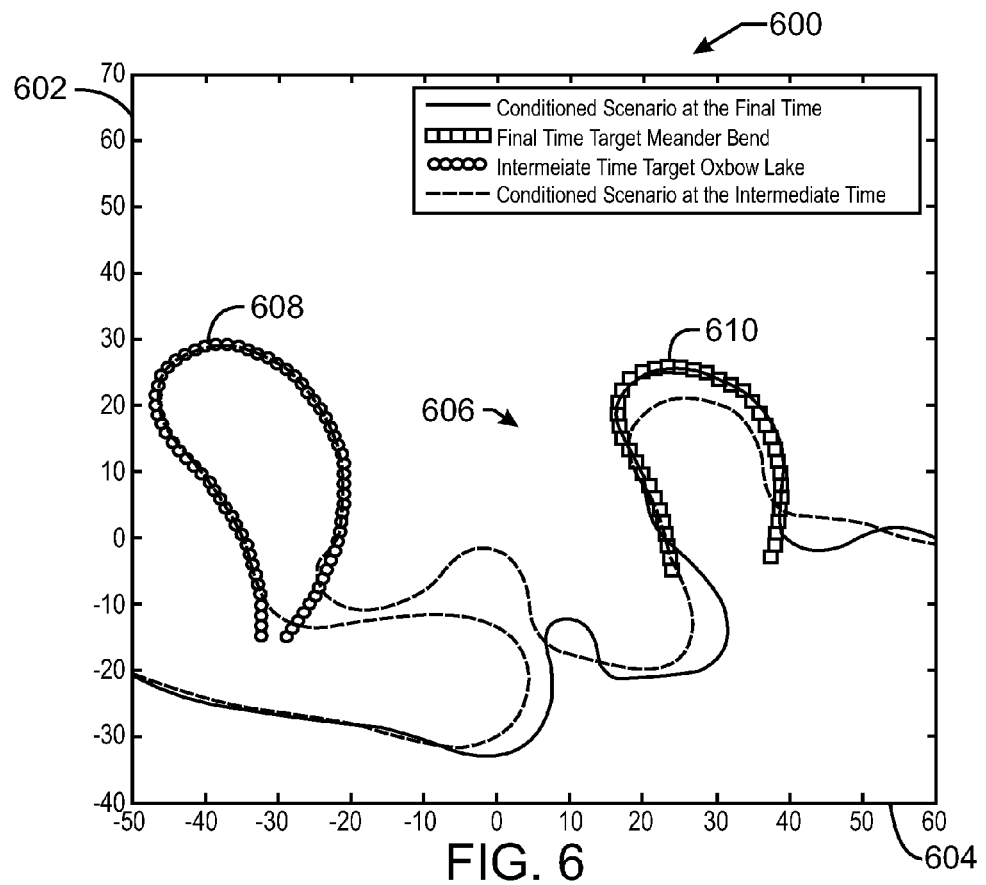
FIG. 6 is a graph that is useful in explaining the matching of an oxbow lake formation at an intermediate time and a target meander bend at a final time.

FIG. 6 is a graph that is useful in explaining the matching of an oxbow lake formation at an intermediate time and a target meander bend at a final time according to disclosed techniques. Graph 600 includes a y-axis 602, which represents the non-dimensionalized y-coordinate. X-axis 604 represents the non-dimensionalized x-coordinate. Graph 600 comprises a family of curves 606. The definition of each one of the family of curves 606 is set forth in the legend shown in graph 600. Also shown in graph 600 is solid line 608, which corresponds to target data for an oxbow lake formation, and solid line 610, which corresponds to a target meander bend. The data shown in graph 600 represents the result of a process designed for matching the target oxbow lake formation at an intermediate time and the target meander bend at a final time. As with the previous examples, the channel centerline at the initial time is not known. A straight line may be employed as an initial estimate of channel centerline position. As successive forward modeling iterations are performed, better matching parameter sets are found with respect to the oxbow lake formation at the intermediate time and the target meander bend at the final time. The thin solid line show the quality of match at the final time while the thin dashed line shows how closely the oxbow lake is matched before the cut-off takes place.

The objective function set forth in equation (14) may be used to constrain a process by the main remnant of the discontinuous cut-off process, e.g., the oxbow lake formation. As such, the formulation shifts its focus from the discontinuous process to the smooth continuous evolution up to an infinitesimally small instant of time prior to the occurrence of discontinuity.

Figure 7:
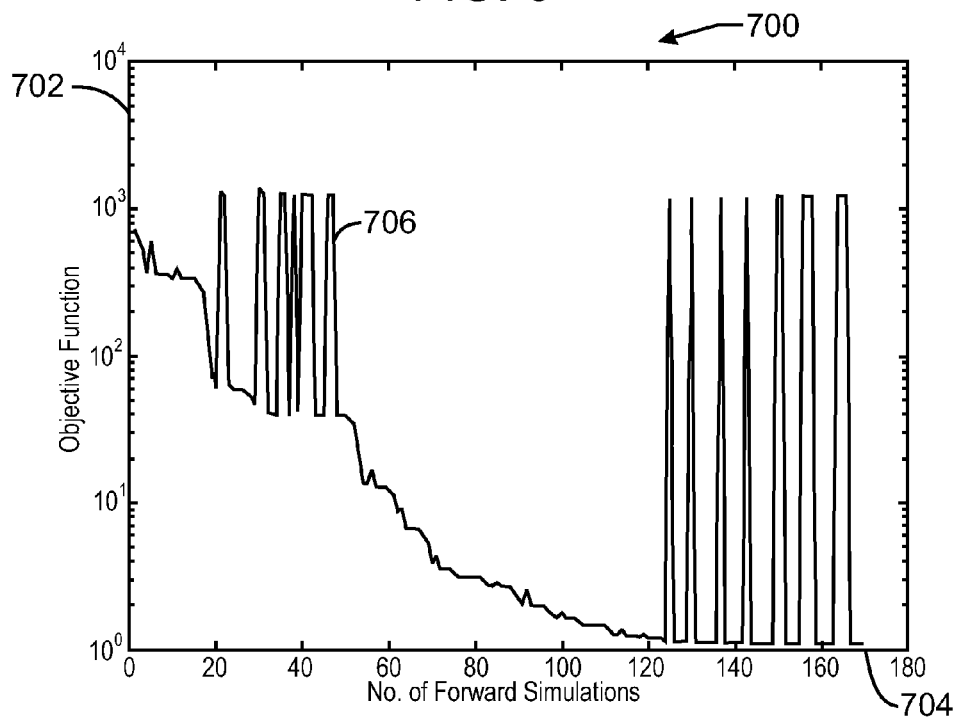
FIG. 7 is a graph showing a convergence plot for a forward modeling process.

FIG. 7 is a graph showing a convergence plot for a forward modeling process according to disclosed techniques. Graph 700 includes a y-axis 702, which represents the value of the objective function. Axis 704 represents a number of forward simulations. Graph 700 includes trace 706. The objective function data shown by the trace 706 indicates a decreasing variation between data predicted by a process according to disclosed techniques and target data. As shown by the trace 706, the reduction in the objective function value is interrupted by sudden jumps due to occurrence of various cut-off events.

Figure 8:
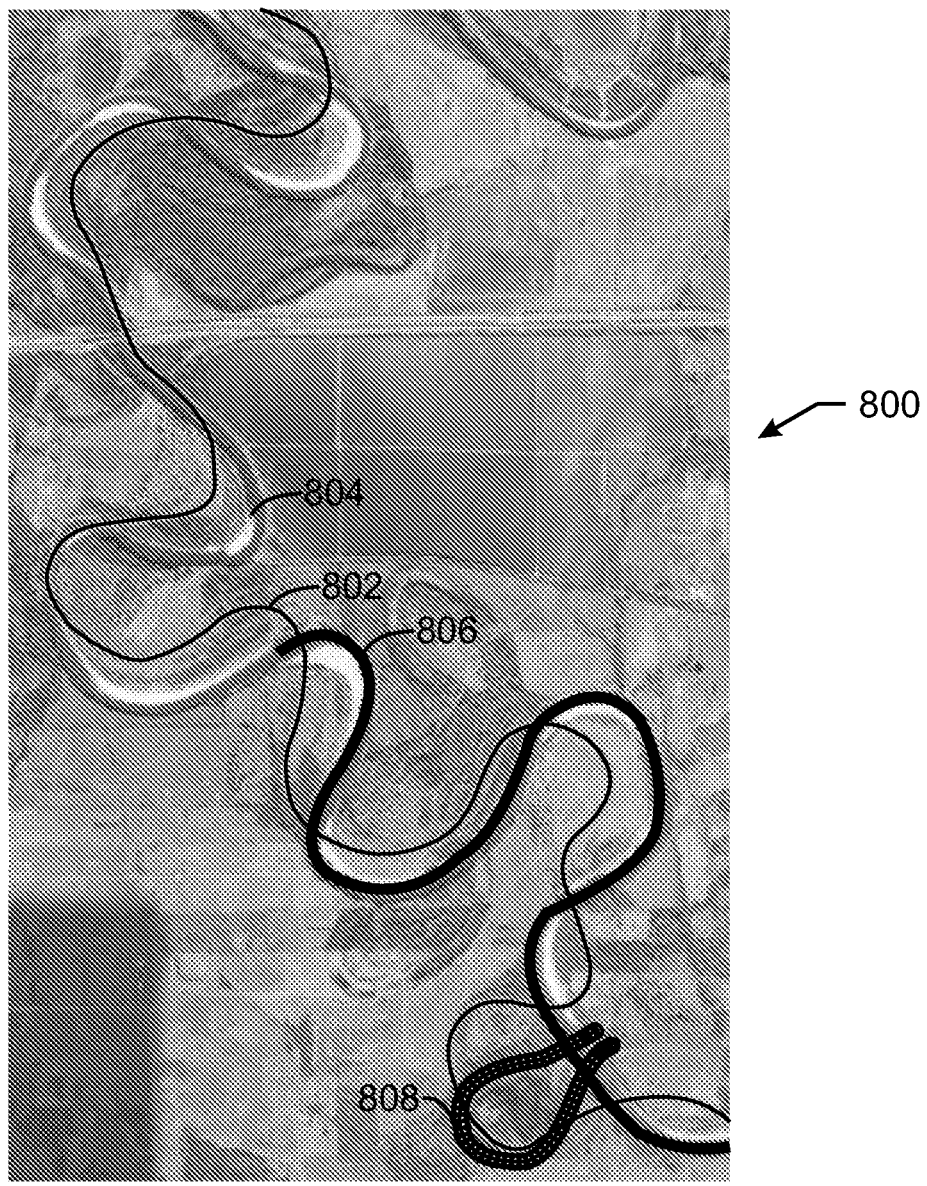
FIG. 8 is a topographical drawing useful in explaining a method of predicting data according to the present technique.

FIG. 8 is a topographical drawing useful in explaining a method of predicting data according to the disclosed techniques. The topographical drawing is generally referred to by the reference number 800. A process of predicting data in accordance with the present technique has been used to study field data corresponding to the Brazos River in Texas, U.S.A., represented in topographical drawing 800. Moreover, topographical drawing 800 represents a 25.3 Km stretch of the Brazos River. The latitude and longitude of the two ends subject to the study are at (30.15°,−96.17°) and (30.08°,−96.14°), respectively.

A first trace 802 represents the initial guess for river centerline at the start time 1941. This initial guess is a mixture of measurements and geological interpretations. A second trace 804 represents the channel centerline as seen on a 2006 satellite image. A third trace 806 represents the final time target meander bend used in this study and is extracted from the satellite image trace 804. A fourth trace 808 represents the target oxbow lake visible on the 2006 satellite image.

The simulation spans 65 years of evolution starting in 1941 and concluding in 2006, with the meander bend of trace 806 used as the target at the final time 2006. A 1953 aerial photo shows that the river is about to form a neck cut-off, so an intermediate time for matching the target oxbow lake is set at 1953. A process according to disclosed techniques does not necessarily operate under the assumption that a cut-off event takes place exactly at the prescribed intermediate time. Moreover, the formulation of the objective function may be done so that the conditioned solution has a cut-off after the imposed intermediate time, preferably close to that time line, and match the target oxbow lake profile as closely as possible at the intermediate time. When there is no information available about the timing of the cut-off event, different conditioned scenarios can be obtained by varying the timing of the event within the simulation time period.

The controls (parameter set) computed by a conditioning problem can potentially provide the user with a coherent physics-constrained insight into the evolution of the system even in places where no data is available. This feature of predictability differentiates the claimed techniques and methodologies from data-matching practices which are not constrained by fundamental laws of nature. As the initial profile in 1941 is also considered unknown, the notion of hierarchical conditioning, described above, is used to obtain a reasonable match with the provided field data. Moreover, hierarchical conditioning may be implemented interactively by using large coefficients for $\alpha$ and $\beta$ in equation (28) at the onset. These coefficients may be subsequently reduced to smaller values for reasons already discussed.

Figure 9:
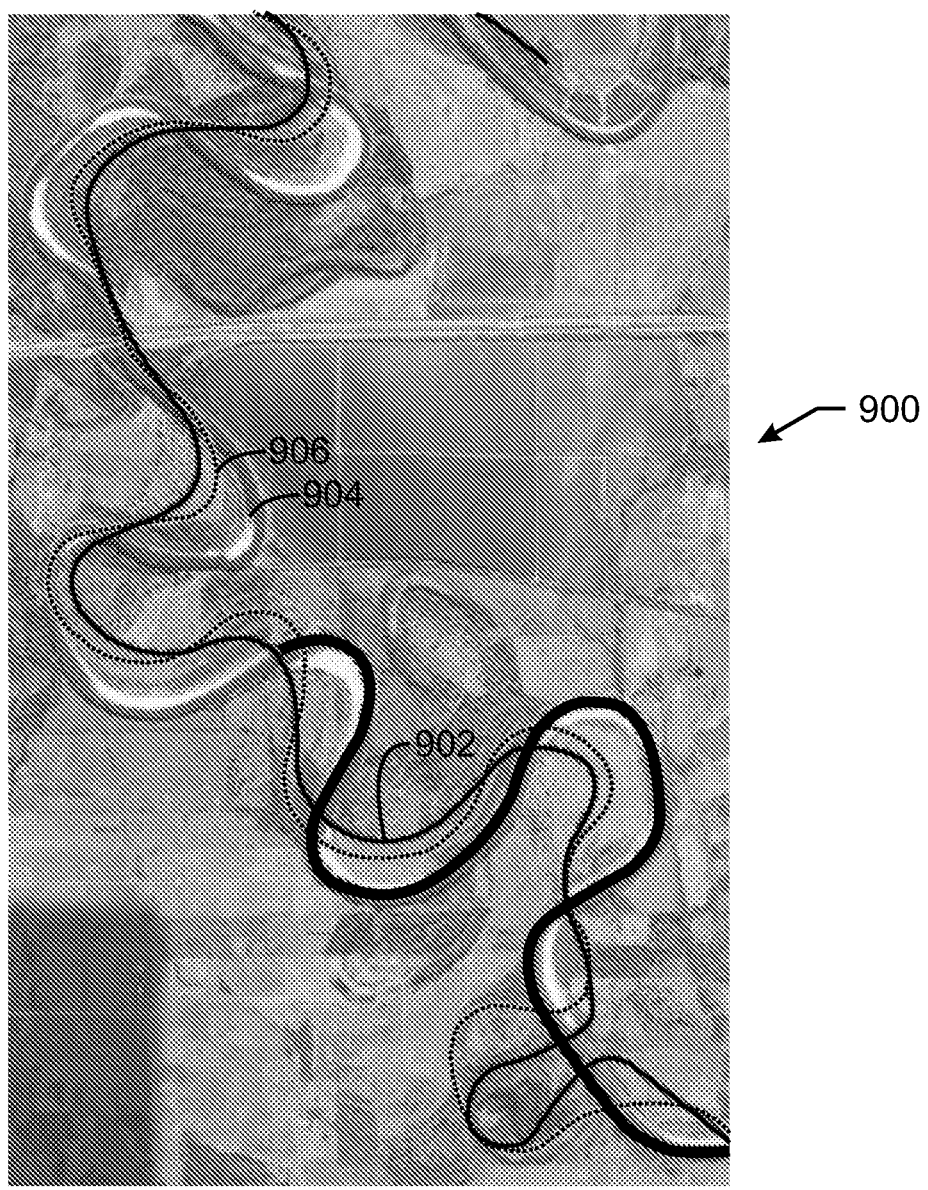
FIG. 9 is another topographical drawing useful in explaining a method of predicting data according to the present technique.

FIG. 9, generally referred to by the reference number 900, depicts the conditioned initial profile in 1941 and the interpreted initial guess. A first trace 902 represents the conditioned initial channel centerline in 1941. A second trace 904 represents the channel centerline as seen on a 2006 satellite image. A third trace 906 represents the interpreted initial guess for channel centerline in 1941.

Traces 902 and 906 are close in most places except in the vicinity of the target oxbow lake (see FIG. 9). Immediately to the north of the targeted oxbow, an older oxbow lake exists which is encompassed by the interpreted centerline while the conditioned profile 902 passes by it. Considering the fact that well consolidated oxbow lakes are quite hard to erode, the conditioned initial profile in 1941 seems to be reasonable.

Figure 10:
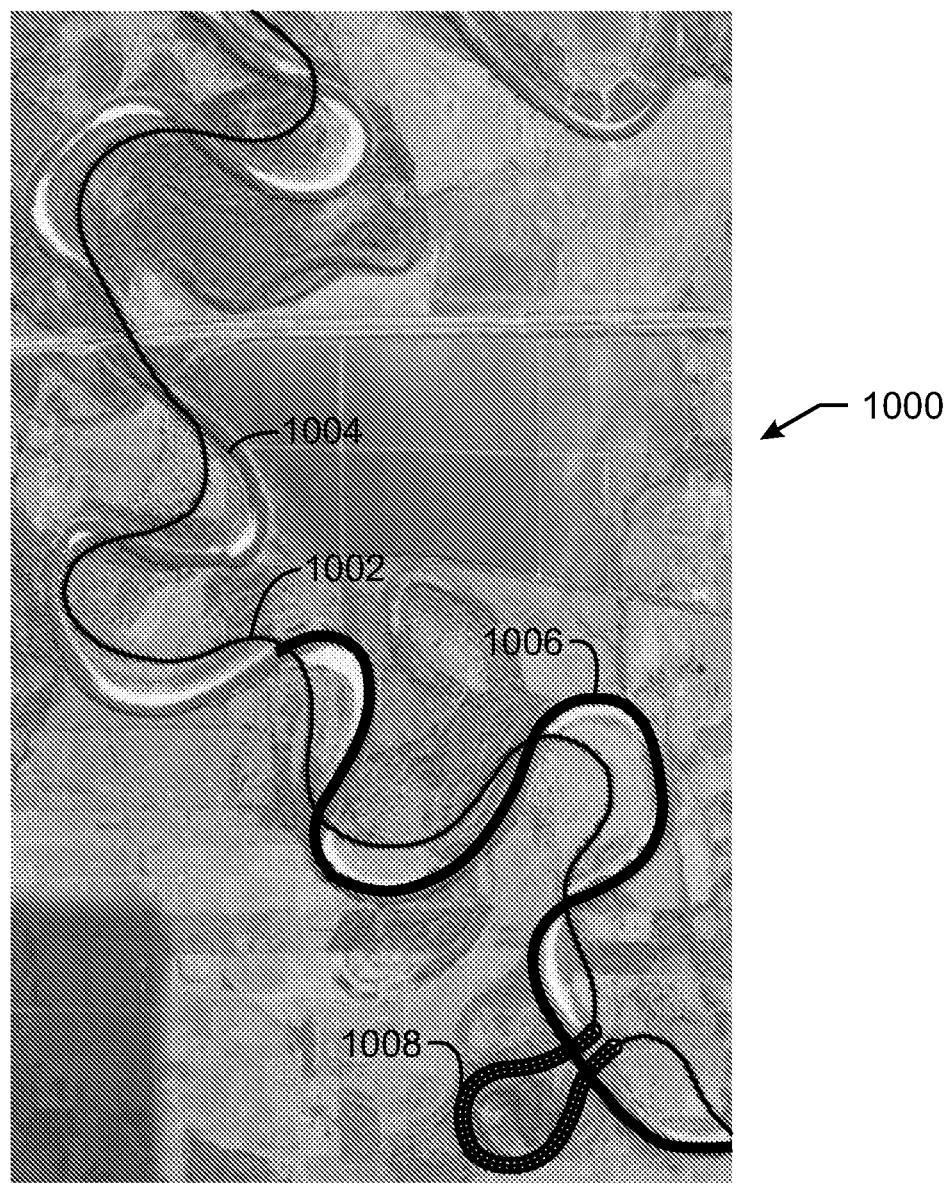
FIG. 10 is still another topographical drawing useful in explaining a method of predicting data according to the present technique.

FIG. 10, generally referred to by the reference number 1000, depicts the channel centerline in the intermediate time 1953 when the cut-off is believed to have happened. A first trace 1002 represents the predicted centerline by the conditioned forward simulation. A second trace 1004 represents the channel centerline as seen on a 2006 satellite image. A third trace 1006 represents the final time target meander bend in 2006. A fourth trace 1008 represents the target oxbow lake. Topographical drawing 1000 shows the close match obtained with the target oxbow lake 1008 right before the cut-off occurs.

Figure 11:
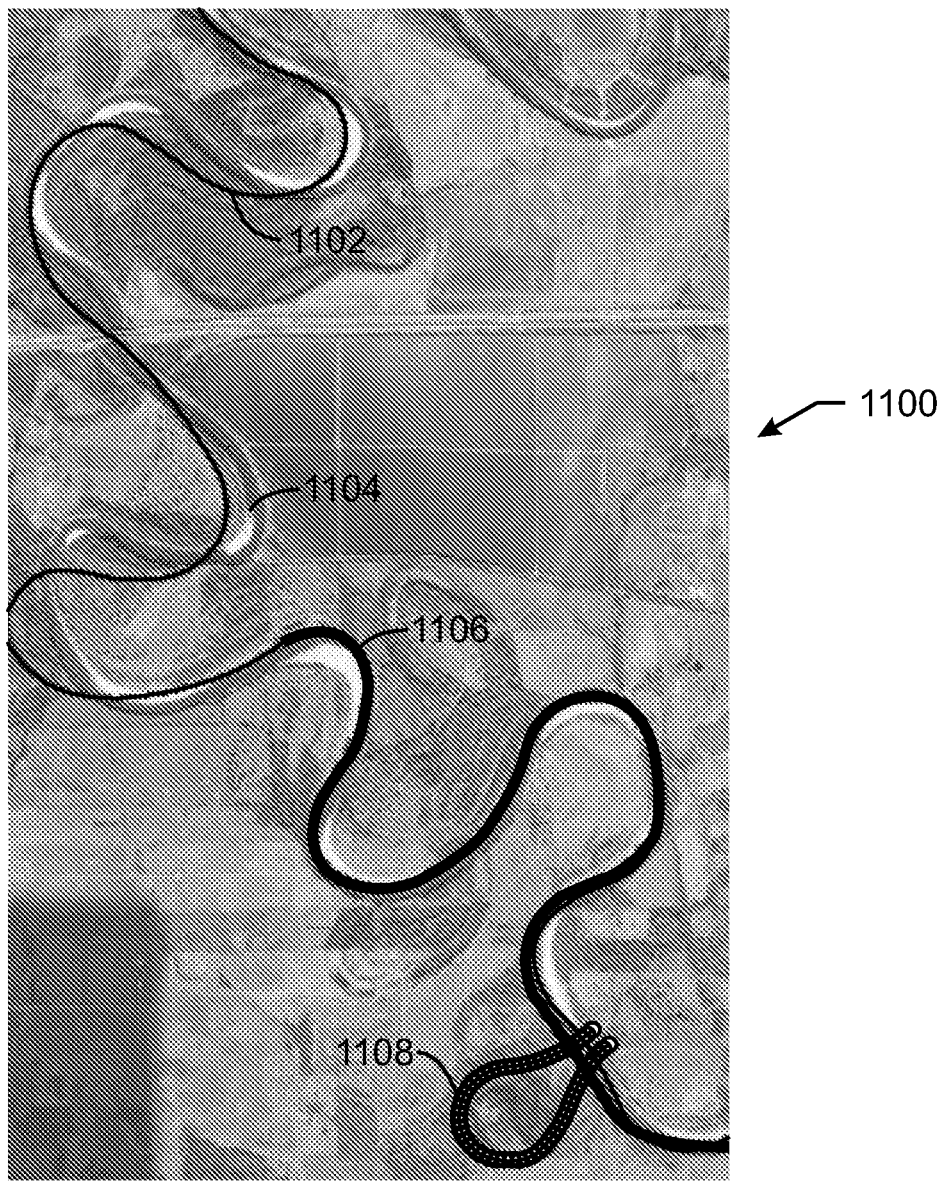
FIG. 11 is yet another topographical drawing useful in explaining a method of predicting data according to the present technique.

FIG. 11, generally referred to by the reference number 1100, depicts the close match obtained at the final time (2006) between the conditioned forward model prediction and the target meander bend. A first trace 1102 represents model prediction of channel centerline in 2006. A second trace 1104 represents the channel centerline as seen on a 2006 satellite image. A third trace 1106 represents the final time target meander bend in 2006. A fourth trace 1108 represents the target oxbow lake. As shown in FIG. 11, the conditioned simulation matches the target meander bend of 2006 very closely. The most significant result of this test case is that the prediction of the conditioned simulation, trace 1102, corresponds closely with the background satellite image upstream of the target bend demonstrating the ability of the present technique to predict data in parts of the spatial domain where no field data is available. This capability outlines an advantage of the proposed method over data-fitting practices that are not constrained by underlying physical processes.

Figure 12:
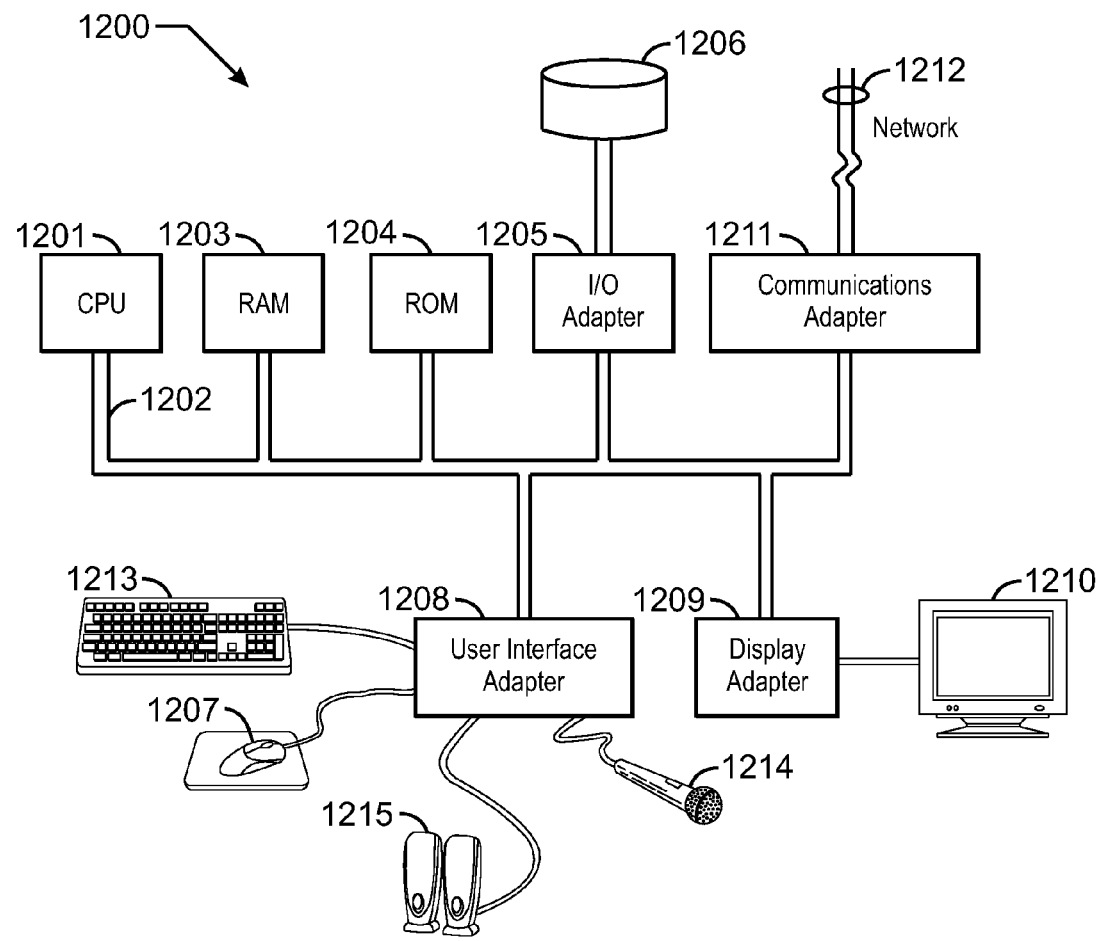
FIG. 12 is a block diagram of a computer network.

FIG. 12 illustrates a computer system 1200 on which software for performing processing operations or process steps or blocks as disclosed herein may be implemented. A central processing unit (CPU) 1201 is coupled to system bus 1202. The CPU 1201 may be any general-purpose CPU, although other types or architectures of CPU 1201 (or other components of exemplary system 1200) may be used as long as CPU 1201 (and other components of system 1200) supports the inventive operations as described herein. CPU 1201 may execute the various logical instructions. For example, the CPU 1201 may execute machine-level instructions for performing processing according to the exemplary operational flow described above in conjunction with FIG. 1. For instance, CPU 1201 may execute machine-level instructions for performing operational block 106 of FIG. 1.

Computer system 1200 may also include random access memory (RAM) 1203, which may be SRAM, DRAM, SDRAM, or the like. Computer system 1200 may also include read-only memory (ROM) 1204 which may be PROM, EPROM, EEPROM, or the like. RAM 1203 and ROM 1204 hold user and system data and programs, as is known in the art. Computer system 1200 may also include an input/output (I/O) adapter 1205, a communications adapter 1211, a user interface adapter 1208, and a display adapter 1209. The I/O adapter 1205, the user interface adapter 1208, and/or communications adapter 1211 may enable a user to interact with computer system 1200 in order to input information.

The I/O adapter 1205 may connect a storage device(s) 1206, such as one or more of a hard drive, compact disc (CD) drive, floppy disk drive, tape drive, etc. to computer system 1200. The storage device(s) may be used when RAM 1203 is insufficient for the memory requirements associated with storing data for operations of the techniques and methodologies disclosed and claimed herein. The data storage of the computer system 1200 may be used for storing information and/or other data used or generated as disclosed herein. Communications adapter 1211 may couple computer system 1200 to a network 1212, which may enable information to be input to and/or output from system 1200 via network 1212 (e.g., the Internet or other wide-area network, a local-area network, a public or private switched telephony network, a wireless network, or any combination of the foregoing). User interface adapter 1208 couples user input devices, such as a keyboard 1213, a pointing device 1207, and a microphone 1214 and/or output devices, such as a speaker(s) 1215 to the computer system 1200. The display adapter 1209 is driven by the CPU 1201 to control the display on a display device 1210 to, for example, display information or a representation pertaining to a portion of a subsurface region under analysis, such as displaying a generated 3D representation of a target area. Moreover, the display device 1210 may be used to produce a visual representation of data describing the analyzed subsurface region determined according to principles disclosed herein.

The architecture of system 1200 may be varied as desired. For example, any suitable processor-based device may be used, including without limitation personal computers, laptop computers, computer workstations, and multi-processor servers. Moreover, the claimed and disclosed techniques and methodologies may be implemented on application specific integrated circuits (ASICs) or very large scale integrated (VLSI) circuits. In fact any number of suitable structures capable of executing logical operations may be used.

The claimed techniques and methodologies may be susceptible to various modifications and alternative forms, and the examples discussed above have been shown only by way of example. However, the claimed techniques and methodologies are not limited to the particular examples disclosed herein, but include all alternatives, modifications, and equivalents falling within the spirit and scope of the appended claims.

What is claimed is:

1. A computer implemented method for correlating data predicted by a process-based model or physics-based model to describe a subsurface region with known data describing the subsurface region, the method comprising:

obtaining data describing the subsurface region;

estimating model parameters of an initial state of the subsurface region;

predicting data describing a subsequent state of the subsurface region with a computer, wherein the predicting data comprises using the model parameters to simulate with a model the evolution of a channel by modeling dynamics of interplay between channel migration and changing sedimentary environment;

comparing the predicted data with the obtained data by computing an objective function taking into account whether the predicted data represent a discontinuous event, wherein the objective function is defined using the following formulation:

$$J_i = \sum_{i=1}^{N_m} \frac{1}{2} \min_{0 < s_i^0 < S - S_i^t} \left\{ \begin{array}{l} \sigma_{1i} \int_0^{S_i^t} \left[ (x(s_i^0 + u) - x_t(u))^2 + \right. \\ \left. (y(s_i^0 + u) - y_t(u))^2 \right] du + \\ \sigma_{2i} \int_0^{S_i^t} \left[ (\kappa(s_i^0 + u) - \kappa_t(u))^2 \right] du \end{array} \right\},$$

where $N_M$ represent the target meander bends and $S_i^t$ represents length of the $i^{th}$ meander loop, σ is the weight associated with $i^{th}$ target bend, K is the geometric quantities computed from centerline coordinates;

determining with a computer a sensitivity of the predicted data if the predicted data is not within an acceptable range of the obtained data, wherein determining the sensitivity comprises computing an adjoint of the objective function;

adjusting the model parameters based on the sensitivity before performing a subsequent iteration of predicting data describing the subsequent state of the subsurface region; and outputting a representation of the subsurface region based on the data describing the subsequent state of the subsurface region.

2. The method for correlating predicted data recited in claim 1, comprising terminating the method if the predicted data is within the acceptable range of the obtained data.

3. The method for correlating predicted data recited in claim 1, comprising taking into account whether the predicted data represents an adaptation by uniformly distributing a series of data points corresponding to a region of curvature of the subsurface region and determining the sensitivity of predicted data at each of the uniformly distributed data points.

4. The method for correlating predicted data recited in claim 1, comprising taking into account whether the predicted data represents an adaptation by clustering a series of data points corresponding to a region of high curvature of the subsurface region and determining the sensitivity of predicted data at each of the clustered data points.

5. The method for correlating predicted data recited in claim 1, wherein taking into account whether the predicted data represents a discontinuous event comprises recognizing co-existing profiles at a time of the event and determining an accurate relationship between adjoint variables before and after the event.

6. The method for correlating predicted data recited in claim 1, comprising performing hierarchical conditioning by obtaining an acceptable correlation at a coarse level before evaluating the sensitivity level at a fine level.

7. The method for correlating predicted data recited in claim 1, comprising predicting data describing a subsequent state of the subsurface region for a region of the subsurface region for which no data is obtained.

8. The method for correlating predicted data recited in claim 1, wherein predicting data describing a subsequent state of the subsurface region is performed via a process-based model.

9. The method for correlating predicted data recited in claim 1, wherein the discontinuous event is a cut-off.

10. The method for correlating predicted data recited in claim 1, wherein outputting the representation of the subsurface region comprises displaying a visual representation of the subsurface region based on the data describing the subsequent state of the subsurface region.

11. The method for correlating predicted data recited in claim 1, further comprising sequestering a carbon-containing substance using the outputted representation of the subsurface region.

12. A method for producing hydrocarbons from an oil and/or gas field, the method comprising:
  obtaining data describing an oil and/or gas field;
  estimating model parameters of an initial state of the subsurface region;
  predicting data describing a subsequent state of the oil and/or gas field, wherein the predicting data comprises using input model parameters to simulate with a model evolution of a channel by modeling dynamics of interplay between channel migration and changing sedimentary environment;
  comparing the predicted data with the obtained data by computing an objective function taking into account whether the predicted data represents a discontinuous event, wherein the objective function is defined using the following formulation:

$$J_i = \sum_{i=1}^{N_m} \frac{1}{2} \underset{0 < s_i^0 < S - S_i^t}{\text{Min}} \left\{ \begin{array}{l} \sigma_{1i} \int_0^{S_i^t} [(x(s_i^0 + u) - x_t(u))^2 + \\ (y(s_i^0 + u) - y_t(u))^2] du + \\ \sigma_{2i} \int_0^{S_i^t} [(\kappa(s_i^0 + u) - \kappa_t(u))^2] du \end{array} \right\},$$

where $N_M$ represent the target meander bends and $S_i^t$ represents length of the $i^{th}$ meander loop, $\sigma$ is the weight associated with $i^{th}$ target bend, K is the geometric quantities computed from centerline coordinates;
  determining a sensitivity of the predicted data if the predicted data is not within an acceptable range of the obtained data, wherein determining the sensitivity comprises computing an adjoint of the objective function;
  adjusting the input model parameters based on the sensitivity before performing a subsequent iteration of predicting data describing the subsequent state of the oil and/or gas field; and
  extracting hydrocarbons from the oil and/or gas field using the predicted data if the predicted data is within an acceptable range of the obtained data.

13. The method for producing hydrocarbons recited in claim 12, comprising taking into account whether the predicted data represents an adaptation by uniformly distributing a series of data points corresponding to a region of curvature of the subsurface region and determining the sensitivity of predicted data at each of the uniformly distributed data points.

14. The method for producing hydrocarbons recited in claim 12, comprising taking into account whether the predicted data represents an adaptation by clustering a series of data points corresponding to a region of high curvature of the subsurface region and determining the sensitivity of predicted data at each of the clustered data points.

15. The method for producing hydrocarbons recited in claim 12, wherein taking into account whether the predicted data represents a discontinuous event comprises recognizing co-existing profiles at a time of the event and determining an accurate relationship between adjoint variables before and after the event.

16. The method for producing hydrocarbons recited in claim 12, further comprising performing hierarchical conditioning by obtaining an acceptable correlation at a coarse level before evaluating the sensitivity level at a fine level.

17. The method for producing hydrocarbons recited in claim 12, further comprising predicting data describing a subsequent state of the subsurface region for a region of the subsurface region for which no data is obtained.

18. The method for producing hydrocarbons recited in claim 12, wherein predicting data describing a subsequent state of the oil and/or gas field is performed via a process-based model.

19. The method for producing hydrocarbons recited in claim 12, comprising displaying a visual representation of the oil and/or gas field based on the data describing the subsequent state of the oil and/or gas field.

20. The method for producing hydrocarbons recited in claim 12, comprising transforming data representative of the sensitivity of the predicted data from a physical space to a computational space.

21. A computer system that is configured to correlate data predicted by a process-based model or physics-based model to describe a subsurface region with known data describing the subsurface region, the computer system comprising:
  a processor; and
  a tangible, machine-readable storage medium that stores tangible, machine-readable instructions for execution by the processor, the tangible, machine-readable instructions comprising:
    code that is configured to obtain data describing the subsurface region;
    code that is configured to obtain estimates of input model parameters of an initial state of the subsurface region;
    code that is configured to predict data describing a subsequent state of the subsurface region, wherein the code is configured to use input model parameters to simulate with a model the evolution of a channel by modeling dynamics of interplay between channel migration and changing sedimentary environment;

code that is configured to compare the predicted data with the obtained data by computing an objective function taking into account whether the predicted data represents a discontinuous event, wherein the objective function is defined using the following formulation:

$$J_i = \sum_{i=1}^{N_m} \frac{1}{2} \underset{0<s_i^0<S-S_i^t}{\text{Min}} \left\{ \begin{array}{l} \sigma_{1i} \int_0^{S_i^t} \left[ (x(s_i^0+u) - x_t(u))^2 + (y(s_i^0+u) - y_t(u))^2 \right] du + \\ \sigma_{2i} \int_0^{S_i^t} \left[ (\kappa(s_i^0+u) - \kappa_t(u))^2 \right] du \end{array} \right\},$$

where $N_M$ represent the target meander bends and $S_i^t$ represents length of the $i^{th}$ meander loop, $\sigma$ is the weight associated with $i^{th}$ target bend, K is the geometric quantities computed from centerline coordinates;

code that is configured to determine a sensitivity of the predicted data if the predicted data is not within an acceptable range of the obtained data, wherein determining the sensitivity comprises computing the adjoint of the objective function; and code that is configured to adjust the input model parameters based on the sensitivity before performing a subsequent iteration of predicting data describing the subsequent state of the subsurface region.

22. The computer system of claim 21, further comprising: a display for displaying a visual representation of the subsurface region based on the data describing the subsequent state of the subsurface region, wherein the tangible, machine-readable instructions further include code for outputting said visual representation to the display.

23. The computer system of claim 21, further comprising: code that is configured to take into account whether the predicted data represents an adaptation by uniformly distributing a series of data points corresponding to a region of curvature of the subsurface region and determining the sensitivity of predicted data at each of the uniformly distributed data points.

* * * * *